United States Patent
Hoson et al.

(10) Patent No.: US 10,402,597 B2
(45) Date of Patent: Sep. 3, 2019

(54) MAGNETIC FIELD GENERATOR, CONTROL METHOD FOR MAGNETIC FIELD GENERATOR, AND MAGNETIC RECORDING MEDIUM PROCESSING DEVICE

(71) Applicant: NIDEC SANKYO CORPORATION, Suwa-gun, Nagano (JP)

(72) Inventors: Keiji Hoson, Nagano (JP); Ikuro Kuribayashi, Nagano (JP); Tomomi Takeda, Nagano (JP); Yohei Shimizu, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 207 days.

(21) Appl. No.: 15/323,158

(22) PCT Filed: Jun. 23, 2015

(86) PCT No.: PCT/JP2015/067937
§ 371 (c)(1),
(2) Date: Dec. 30, 2016

(87) PCT Pub. No.: WO2016/002568
PCT Pub. Date: Jan. 7, 2016

(65) Prior Publication Data
US 2017/0140180 A1 May 18, 2017

(30) Foreign Application Priority Data

Jul. 1, 2014 (JP) .................. 2014-136205

(51) Int. Cl.
*G06K 7/08* (2006.01)
*G11B 5/09* (2006.01)
*G07D 9/00* (2006.01)

(52) U.S. Cl.
CPC ............... *G06K 7/087* (2013.01); *G06K 7/08* (2013.01); *G07D 9/00* (2013.01); *G11B 5/09* (2013.01)

(58) Field of Classification Search
None
See application file for complete search history.

(56) References Cited

U.S. PATENT DOCUMENTS

| 7,837,110 | B1 * | 11/2010 | Hess | ...................... | G06K 7/084 235/449 |
| 2009/0189459 | A1 | 7/2009 | Seefried et al. | | |
| 2014/0332591 | A1 * | 11/2014 | Ishikawa | ............ | G11B 5/00808 235/449 |

FOREIGN PATENT DOCUMENTS

| JP | 2001014622 A | 1/2001 |
| JP | 2001067524 A | 3/2001 |

(Continued)

OTHER PUBLICATIONS

Extended European Search Report for corresponding EP Application 15815109.2 dated Mar. 6, 2018.

(Continued)

*Primary Examiner* — Thien M Le
*Assistant Examiner* — April A Taylor
(74) *Attorney, Agent, or Firm* — Cantor Colburn LLP

(57) ABSTRACT

A magnetic field generator may include a magnetic field generation part including a resonance part including an inductor and a capacitor connected with each other, and which is structured so that an AC current is flowed between the inductor and the capacitor by charging electric charge to the capacitor and discharging the electric charge to generate a magnetic field by a resonance; a current direction monitoring section structured to monitor a direction of a current flowing through the inductor of the magnetic field generation part; and a judging section structured to control a timing (Continued)

for charging in the magnetic field generation part depending on the direction of the current flowing through the inductor which is obtained by monitoring of the current direction monitoring section.

24 Claims, 14 Drawing Sheets

(56) References Cited

FOREIGN PATENT DOCUMENTS

| JP | 2007220200 A | 8/2007 |
| JP | 2015197687 A | 11/2015 |
| WO | 2013030877 A1 | 3/2013 |
| WO | 2015157824 A1 | 10/2015 |

OTHER PUBLICATIONS

International Search Report corresponding to Application No. PCT/JP2015/067937; dated Sep. 8, 2015, with English translation.

* cited by examiner

511: Resonance Part
525: Drive Power Supply Part
526: Reference Potential Part
ND51: Connection Node
ND52: First Node
ND53: Second Node
527: ResonanceDrive Part
53C: Current Direction Monitoring Part

MAGNETIC FIELD GENERATOR, CONTROL METHOD FOR MAGNETIC FIELD GENERATOR, AND MAGNETIC RECORDING MEDIUM PROCESSING DEVICE

CROSS REFERENCE TO RELATED APPLICATIONS

This is the U.S. national stage of application No. PCT/JP2015/067937, filed on Jun. 23, 2015. Priority under 35 U.S.C. § 119(a) and 35 U.S.C. § 365(b) is claimed from Japanese Application No. 2014-136205, filed Jul. 1, 2014, the disclosure of which is incorporated herein by reference.

TECHNICAL FIELD

At least an embodiment of the present invention relates to a magnetic field generator structured to generate a disturbing magnetic field, a control method for the magnetic field generator, and a magnetic recording medium processing device provided with the magnetic field generator structured to perform reading of magnetic data recorded in a magnetic recording medium and/or writing of magnetic data to a magnetic recording medium.

BACKGROUND

Conventionally, a card reader has been widely utilized as a magnetic recording medium processing device in which reading of magnetic data recorded in a card-shaped magnetic recording medium as a magnetic recording medium (hereinafter, referred to as a "card") and/or writing of magnetic data to a card are performed. This type of a card reader is, for example, mounted and used in a host apparatus such as an ATM (Automate Teller Machine) which is installed in a financial institution such as a bank. Further, in an industry such as a financial institution where a card reader is utilized, illegal acquisition of magnetic data of a card by a fraudulent person who attaches a magnetic head to a front side of a card insertion part of a card reader, in other words, so-called skimming has conventionally become a large issue.

In order to cope with the issue, a card reader has been conventionally proposed which is provided with a magnetic field generator structured to generate a disturbing magnetic field for disturbing reading of magnetic data of a card by a magnetic head for skimming (hereinafter, referred to as a "skimming magnetic head") which is attached to a front side of a card insertion port (see, for example, Patent Literature 1). In the card reader described in Patent Literature 1, a technique is disclosed that a magnetic field (magnetism) generator is provided in a card insertion port of the card reader and reading of magnetic data of a card of a user by a skimming magnetic head is disturbed by a disturbing magnetic field (magnetism) generated from the magnetic field (magnetism) generator.

In this technique, a structure in which a power supply for a coil (inductor) is driven by a transistor having a switching function is adopted as a circuit for generating a disturbing magnetic field.

In the card reader shown in Patent Literature 1, the above-mentioned magnetic field (magnetism) generator is operated as follows. A fraudulent person attaches a skimming magnetic head which is a magnetic head and a magnetic reading circuit to a card insertion port of a card reader for reading magnetic data of a card. In order to prevent the skimming magnetic head from reading magnetic data, a disturbing magnetic field is generated toward the skimming magnetic head.

PATENT LITERATURE

[PTL 1] Japanese Patent Laid-Open No. 2001-67524 (or Japanese Patent No. 3936496)

However, in a magnetic field generator used in Patent Literature 1, a power supply for a coil (inductor) is operated by a circuit which is driven by a transistor having a switching function and thus magnetic field generation is temporary and, as a result, there may be a case that a disturbing time is short or the magnetic field is weak.

SUMMARY

Therefore, in view of the problem described above, at least an embodiment of the present invention provides a magnetic field generator, a control method for the magnetic field generator and a magnetic recording medium processing device which are capable of continuously and effectively generating a disturbing magnetic field.

A magnetic field generator in a first aspect of at least an embodiment of the present invention includes a magnetic field generation part including a resonance part in which an inductor and a capacitor are connected with each other and which is structured so that an AC current is flowed between the inductor and the capacitor by charging electric charge to the capacitor and discharging the electric charge to generate a magnetic field by a resonance, a current direction monitoring section which monitors a direction of a current flowing through the inductor of the magnetic field generation part, and a judging section which controls a timing for charging in the magnetic field generation part depending on the direction of the current flowing through the inductor which is obtained by monitoring of the current direction monitoring section.

According to this structure, a disturbing magnetic field can be continuously generated and a timing for storing electric charge by flowing a DC current to the capacitor of the resonance part can be set appropriately by monitoring a direction of a current flowing through the inductor and thus the disturbing magnetic field can be efficiently controlled with a high degree of accuracy.

Preferably, the inductor is alternately flowed with a first direction current flowing from one end side to the other end side and a second direction current from the other end side to the one end side, and the judging section includes a current direction judging section which judges whether the current flowing through the inductor is switched to the first direction current or not based on a monitoring result of the current direction monitoring section, and an operation instructing section which drives and controls to charge the magnetic field generation part based on that the current flowing through the inductor is switched to the first direction current. According to this structure, it is judged whether a current flowing through the inductor is switched to the first direction current or not based on a monitoring result of the current direction monitoring section and thus, a timing for storing electric charge by flowing a DC current to the capacitor of the resonance part can be set appropriately with a high degree of accuracy.

Preferably, the judging section includes a time judging section which judges whether a resonance time previously set has elapsed or not after the charging is stopped, and the operation instructing section confirms that the resonance time has elapsed and that the current flowing through the inductor is switched to the first direction current and then drives and controls to charge the magnetic field generation part. According to this structure, a previously set resonance time is judged and, after an appropriate time has elapsed, it is confirmed that the current is switched to the first direction. Therefore, a timing for storing electric charge by flowing a DC current to the capacitor of the resonance part can be further set appropriately with a high degree of accuracy.

Preferably, the time judging section of the judging section judges whether a monitoring time previously set has elapsed or not after the resonance time has elapsed, and the operation instructing section drives and controls to charge the magnetic field generation part when the monitoring time has elapsed and the current flowing through the inductor is not switched to the first direction current. According to this structure, the time judging section judges whether a previously set monitoring time has elapsed or not and the operation instructing section drives and controls to charge the magnetic field generation part when the current flowing through the inductor is not switched to the first direction current after the monitoring time has elapsed and thus charging and a resonance can be continuously performed over a desired period.

Preferably, the time judging section of the judging section judges whether a charge time previously set has elapsed or not and, when the current flowing through the inductor is switched to the first direction current within the charge time based on a monitoring result of the current direction monitoring section, the operation instructing section starts a resonance after the charge time has elapsed. According to this structure, when the operation instructing section recognizes that the previously set charge time "Tc" has elapsed, the magnetic field generation part is driven and controlled in a resonance state and thus resonance can be started at an appropriate timing.

Preferably, the operation instructing section of the judging section terminates as an abnormality when the current flowing through the inductor is not switched to the first direction current within the charge time. According to this structure, in a case that the current flowing through the inductor is not switched to the first direction current, the judging section terminates drive control of the magnetic field generation part as an abnormality. Therefore, malfunction of the resonance part due to damage or the like can be detected and thus reliability of the magnetic field generator can be improved.

Preferably, the judging section includes a time judging section which judges whether a resonance time previously set has elapsed or not after the charging is stopped and judges whether a monitoring time previously set has elapsed or not after the resonance time has elapsed, and the current direction judging section acquires a number of times of inversion of the current flowing through the inductor within the resonance time based on a monitoring result of the current direction monitoring section, and the operation instructing section drives and controls the magnetic field generation part depending on the current flowing through the inductor based on a monitoring result of the current direction monitoring section within the monitoring time in a case that an acquired number of times of inversion within the resonance time is not less than a predetermined number of times. According to this structure, the current direction judging section acquires a number of times of inversion of the current flowing through the inductor within the resonance time and the operation instructing section drives and controls the magnetic field generation part depending on the current flowing through the inductor when the acquired number of times of inversion is not less than a predetermined number of times. Therefore, a timing for storing electric charge by flowing a DC current to the capacitor of the resonance part can be set appropriately with a further high degree of accuracy.

Preferably, the operation instructing section of the judging section terminates drive control of the magnetic field generation part as an abnormality in a case that the acquired number of times of inversion does not reach the predetermined number of times within the resonance time. Alternatively, the time judging section of the judging section judges whether a monitoring time previously set has elapsed or not, and the operation instructing section terminates drive control of the magnetic field generation part as an abnormality without charging the magnetic field generation part in a case that the current flowing through the inductor is not switched to the first direction current even when the monitoring time has elapsed. According to this structure, the judging section always monitors a current state of the coil which is an inductor and thus a malfunction of the resonance part due to damage or the like can be detected and reliability as a magnetic field generator can be improved.

A control method for a magnetic field generator in a second aspect of the present invention includes previously providing a resonance part in which an inductor and a capacitor are connected with each other, flowing an AC current between the inductor and the capacitor by charging electric charge to the capacitor and discharging the electric charge and, when the magnetic field generation part for generating a magnetic field by a resonance is driven and controlled, a direction of a current flowing through the inductor of the magnetic field generation part is monitored and a timing for charging the magnetic field generation part is controlled depending on the direction of the current flowing through the inductor which is obtained by the monitoring.

According to this method, a disturbing magnetic field can be continuously generated and a timing for storing electric charge by flowing a DC current to the capacitor of the resonance part can be set appropriately by monitoring a direction of a current flowing through the inductor and thus the disturbing magnetic field can be efficiently controlled with a high degree of accuracy.

A third aspect of at least an embodiment of the present invention is a magnetic recording medium processing device structured to process magnetic information recorded on a magnetic recording medium and the magnetic recording medium processing device includes a magnetic field generator structured to generate a magnetic field for disturbing reading of magnetic information of a magnetic recording medium. The magnetic field generator includes a magnetic field generation part including a resonance part in which an inductor and a capacitor are connected with each other and which is structured so that an AC current is flowed between the inductor and the capacitor by charging electric charge to the capacitor and discharging the electric charge to generate a magnetic field by a resonance, a current direction monitoring section which monitors a direction of a current flowing through the inductor of the magnetic field generation part, and a judging section which controls a timing for charging in the magnetic field generation part depending on the direction of the current flowing through the inductor which is obtained by monitoring of the current direction monitoring section. According to this structure, a timing for storing electric charge by flowing a DC current to the capacitor of the resonance part can be set appropriately and the disturbing magnetic field can be efficiently controlled with a high degree of accuracy. Further, in the magnetic recording medium processing device, a disturbing magnetic field is capable of being generated with an appropriate time period and intensity and thus illegal acquisition of magnetic data can be surely prevented with a high degree of accuracy.

Effects of the Invention

According to at least an embodiment of the present invention, a disturbing magnetic field can be continuously and efficiently generated.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of the present invention will be described below with reference to the accompanying drawings.

In this embodiment, a card reader as a magnetic recording medium processing device will be described as an example in which magnetic data recorded in a card-shaped recording medium are read or magnetic data are recorded.

In the following descriptions, first, a schematic structure of a card reader in accordance with this embodiment is described and then a specific circuit structure, operation and the like of a magnetic field generator structured to generate a disturbing magnetic field are described. Further, taking-in and ejecting operations of a card in the card reader are described in association with a drive timing of a magnetic field generator.

[Schematic Structure of Card Reader]

Figure 1:
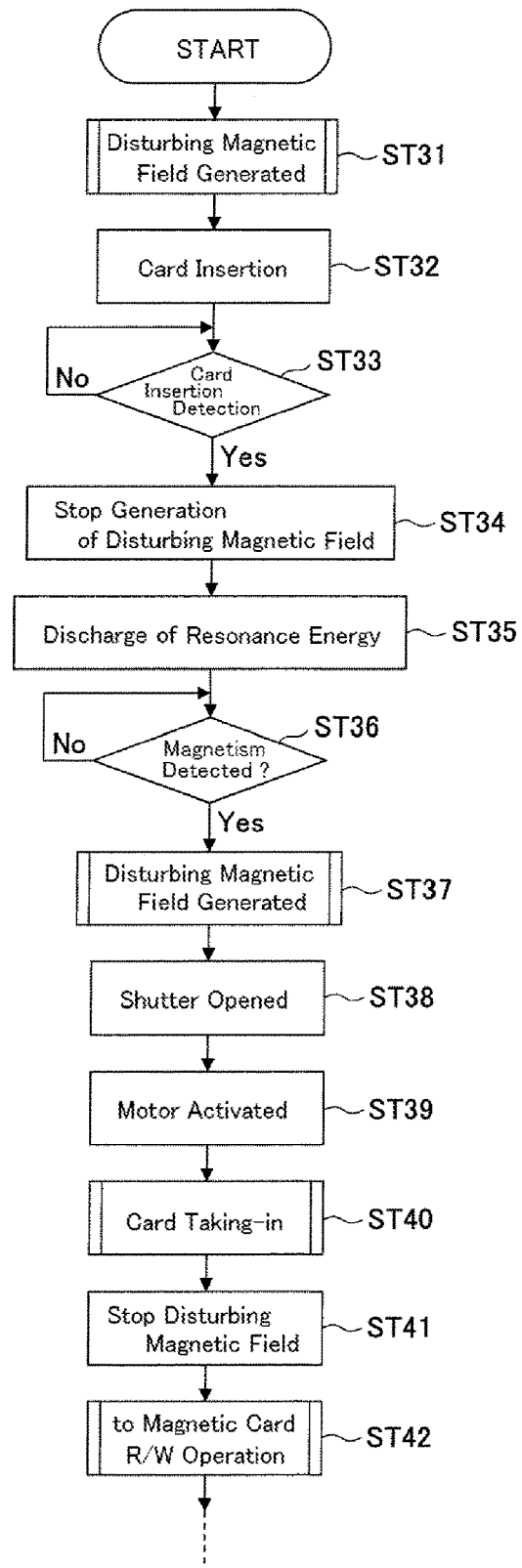
FIG. 1 is a view showing a schematic structure of a principal part of a card reader as a magnetic recording medium processing device in accordance with an embodiment of the present invention.

FIG. 1 is a view showing a schematic structure of a principal part of a card reader as a magnetic recording medium processing device in accordance with an embodiment of the present invention.

Figure 2:
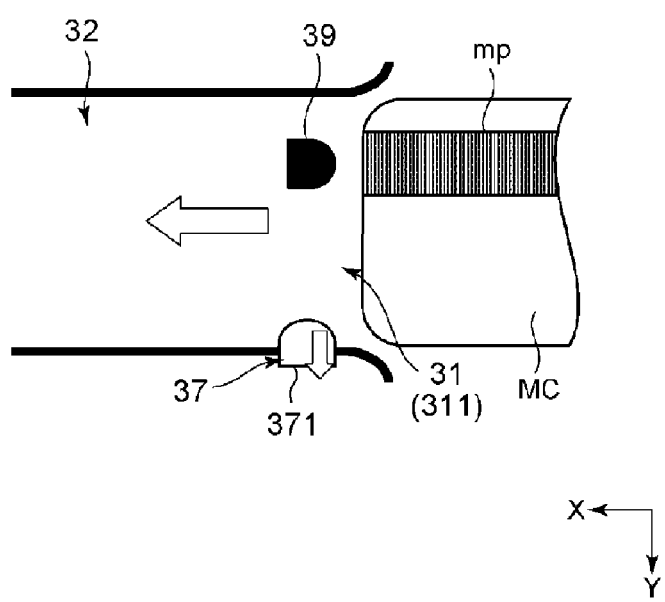
FIG. 2 is a view showing a schematic structure of a card insertion part in a card reader as a magnetic recording medium processing device in accordance with the embodiment.

FIG. 2 is a view showing a schematic structure of a card insertion part in a card reader as a magnetic recording medium processing device in accordance with the embodiment.

A card reader 10 in this embodiment is a magnetic recording medium processing device structured to perform reading of magnetic data recorded in a magnetic stripe "mp" formed on a card "MC" and/or writing of magnetic data to a card "MC" and is, for example, mounted and used in a predetermined host apparatus such as an Automated Teller Machine (ATM) which is installed in a financial institution and the like. The card reader 10 is disposed on a rear side of a front panel 20 which structures a front face of a housing of a host apparatus. The front panel 20 is formed with an opening 21 through which a card "MC" as a magnetic recording medium where magnetic data are recorded is inserted or ejected.

The card reader 10 includes, as shown in FIG. 1, a card processing part 30 structured to perform reading of magnetic data recorded on a card "MC" and/or writing of magnetic data to the card "MC", a card insertion part 31 formed with a card insertion port 311 through which the card "MC" is inserted and ejected, a control section 40 for controlling the card reader 10, and a magnetic field generator 50 structured to generate a disturbing magnetic field for preventing reading of magnetic data of the card "MC" by a skimming magnetic head. An inside of the card reader 10 is formed with a card conveying passage 32 where a card "MC" inserted from the card insertion port 311 is conveyed. Further, the control section 40 structured to perform various controls of the card reader 10 is mounted on a circuit board (not shown).

In this embodiment, a card "MC" is conveyed in an "X" direction (right and left direction) in FIGS. 1 and 2. In other words, the "X" direction is a conveying direction of a card "MC". Further, the "Z" direction (upper and lower direction) in FIG. 1 is a thickness direction of a card "MC" and the "Y" direction (direction perpendicular to a paper face of FIG. 1) in FIGS. 1 and 2 perpendicular to the "X" direction and the "Z" direction is a width direction (short width direction) of a card "MC".

A card "MC" is, for example, a rectangular card made of vinyl chloride whose thickness is about 0.7-0.8 mm. The card "MC" is formed with a magnetic stripe "mp". The card "MC" may be fixed with an IC chip and may be incorporated with an antenna for communication. Further, the card "MC" may be a PET (polyethylene terephthalate) card whose thickness is about 0.18-0.36 mm or may be a paper card having a predetermined thickness.

The card processing part 30 includes a card conveying mechanism 33 structured to convey a card "MC" along the card conveying passage 32, a magnetic head 34 configured to perform reading and/or writing of magnetic data, and a photo sensor 35 configured to detect existence/absence of a card "MC" in the card conveying passage 32.

The card conveying mechanism 33 includes three conveying rollers 331 through 333, a drive motor 36 configured to drive the conveying rollers 331 through 333, and a power transmission mechanism (not shown) structured to transmit power of the drive motor 36 to the conveying rollers 331 through 333. Further, the card conveying mechanism 33 includes pad rollers 334 through 336 which are oppositely disposed to the respective conveying rollers 331 through 333 and are urged toward the conveying rollers 331 through 333. Three conveying rollers 331 through 333 are separately disposed from each other with a predetermined space therebetween in a conveying direction of a card "MC".

The conveying rollers 331, 332 and 333 are rotationally driven by the drive motor 36 under control of the control section 40.

The magnetic head 34 is, as shown in FIG. 1, disposed so that a rotation center of the conveying roller 332 disposed in a center part of the card processing part 30 in a conveying direction of a card "MC" and a center of the magnetic head 34 are substantially coincided with each other in the "X" direction. Further, a pad roller 335 is oppositely disposed to the magnetic head 34 so as to apply an urging force to a card "MC" passing along the card conveying passage 32 toward the magnetic head 34.

The photo sensor 35 is an optical type sensor having a light emitting element and a light receiving element. In this embodiment, the magnetic head 34 starts reading of magnetic data recorded in a magnetic stripe "mp" immediately after a tip end of a card "MC" is detected by a photo sensor 351 and reading of magnetic data is finished immediately before the card "MC" is not detected by the photo sensor 351. In other words, in this embodiment, it can be detected by the photo sensor 351 whether reading of magnetic data is performed or not by the magnetic head 34.

The card insertion part 31 includes a card insertion detection mechanism 37 structured to detect whether a card "MC" is inserted into the card insertion port 311 or not, a shutter 38 configured to open and close the card conveying passage 32, and a pre-head (magnetic head) 39 configured to read magnetic data recorded in a magnetic stripe "mp".

The card insertion detection mechanism 37 includes a card width sensor 371 as a card detection sensor which is, for example, as shown in FIG. 2, turned "on" when one end part in a width direction of an inserted card "MC" is pressed in a lateral direction ("Y" direction) and turned "off" when the card "MC" is separated and its pressing state is released.

The card insertion detection mechanism 37 may be structured, for example, so as to have a card width sensor (card detection sensor) which detects whether a sensor lever not shown capable of contacting with one end part in a width direction of a card "MC" is contacted with the card "MC" or not. In this case, a lever of a sensor for detecting insertion of a card is turnable with a predetermined turnable shaft as a center and is disposed so as to be capable of protruding to and retreating from the card conveying passage 32.

The card width sensor 371 may be an optical type sensor having a light emitting element and a light receiving element. Further, the card insertion detection mechanism 37 may be a mechanical type detection mechanism having a contact point which is capable of directly contacting with an end part in a width direction of a card "MC".

The pre-head 39 is disposed in the vicinity of the card insertion port 311 in a conveying direction of a card "MC". Specifically, the pre-head 39 is disposed in the vicinity of the card insertion detection mechanism 37, for example, in the vicinity of an abutting portion of the card width sensor 371 with a card "MC". In this embodiment, the pre-head 39 reads magnetic data recorded in a magnetic stripe "mp" from a time immediately after a tip end of a card "MC" is detected by the card insertion detection mechanism 37 and finishes reading of magnetic data before the card "MC" is no longer detected by the card insertion detection mechanism 37. In other words, in this embodiment, it can be detected by the card insertion detection mechanism 37 whether reading of magnetic data is performed by the pre-head 39 or not.

The magnetic field generator 50 includes a magnetic field generation part having a resonance part (resonance circuit) in which an inductor and a capacitor are connected with each other and an alternating current is flowed between the inductor and the capacitor by charging electric charge to the capacitor and discharging the electric charge to generate a magnetic field by a resonance, a current direction monitoring circuit which monitors a direction of electric current flowing through the inductor of the magnetic field generation part, and a drive control section structured to drive and control the magnetic field generation part. A specific structure of the magnetic field generator 50 will be described in detail below.

[Schematic Structure of Control Section of Card Reader]

Figure 3:
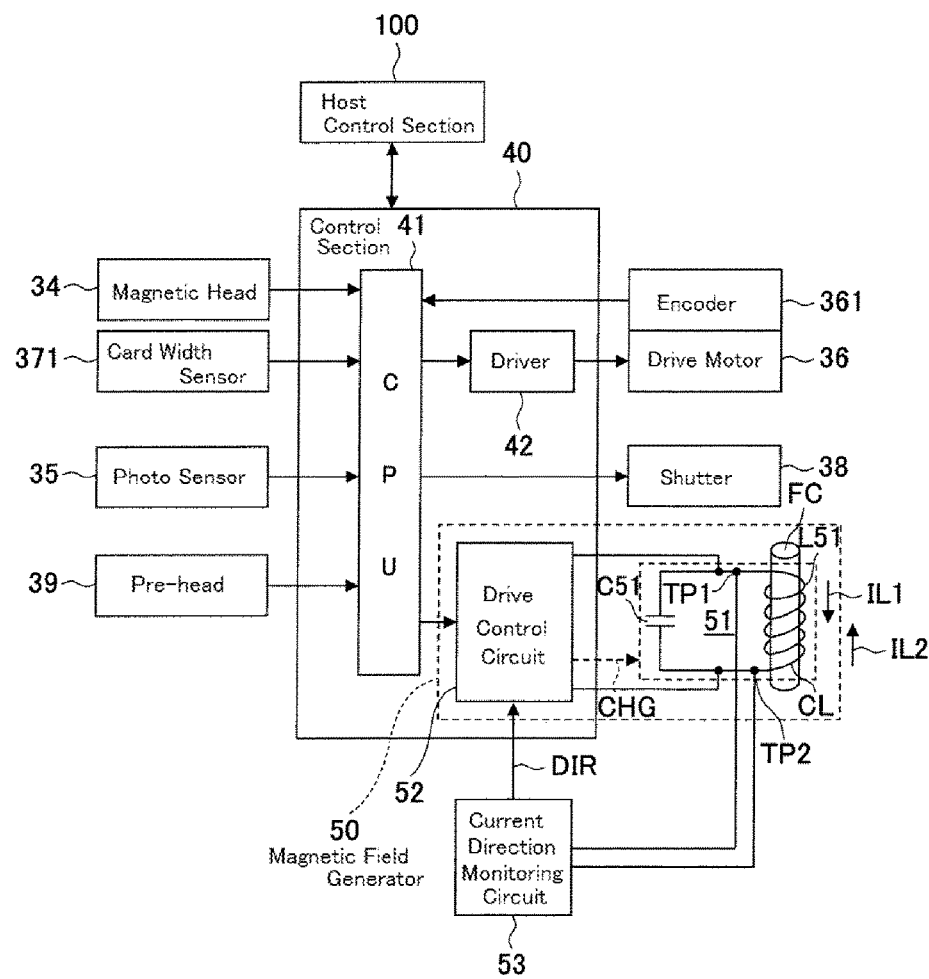
FIG. 3 is a block diagram showing a schematic structure of a control section and its relating portions of the card reader shown in FIG. 1.

FIG. 3 is a block diagram showing a schematic structure of a control section 40 and its relating portions of the card reader 10 shown in FIG. 1. In FIG. 3, a structural example of an inductor and a connection example with the capacitor of a magnetic field generator for generating a disturbing magnetic field provided in the card reader in accordance with this embodiment are also shown.

A control section 40 is mounted on a circuit board (not shown). The control section 40 performs various controls for respective parts of the card reader 10 and is, for example, structured so as to include a CPU 41. The control section 40 controls conveying operation of a card "MC", reading operation by the magnetic head 34 and the like according to control programs stored in a built-in ROM. In addition, the control section 40 is connected with the photo sensor 35, the card width sensor 371 as a card detection sensor, and the pre-head 39 and output signals from these structures are inputted into the control section 40. Further, a drive motor 36 is connected with the control section 40 through a driver 42. In addition, an encoder 361 is connected with the control section 40 and an output signal from the encoder 361 configured to detect a rotating state of the drive motor 36 and the like is inputted into the control section 40.

In this embodiment, the control section 40 is connected with a magnetic field generator 50 structured to generate a disturbing magnetic field to a skimming magnetic head which is attached illegally. The magnetic field generator 50 is driven and controlled so as to generate a magnetic field and to stop generation of the magnetic field depending on a card detection result of the card width sensor 371, a magnetic detection result of the pre-head 39, and the like.

[Schematic Structure of Magnetic Field Generator]

The magnetic field generator 50 in this embodiment includes a magnetic field generation part 51, a drive control circuit (drive control section) 52 configured to drive and control generation of a magnetic field by the magnetic field generation part 51, stoppage of the magnetic field generation part 51 and the like, and a current direction monitoring circuit 53 structured to monitor a direction of an electric current flowing the inductor of the magnetic field generation part 51.

The magnetic field generation part 51 is structured so as to include a coil "L51" as an inductor for generating a magnetic field. The coil "L51" is, for example, formed so that a coil "CL" is wound around an iron core "FC" as shown in FIG. 3. In this embodiment, the magnetic field generation part 51 is disposed in the card insertion part 31. The magnetic field generation part 51 is formed with a resonance part (parallel resonance circuit) in which the coil "L51" is connected in parallel with the capacitor "C51" as an example described in detail below and a disturbing magnetic field is continuously generated. The magnetic field generation part 51 is driven and controlled so that a disturbing magnetic field is continuously generated with appropriate time and intensity.

As described above, the magnetic field generator 50 can be structured of a parallel resonance circuit in which the coil (inductor) "L51" and the capacitor (condenser) "C51" are connected in parallel with each other. In this parallel resonance circuit, first, a DC current is flowed to the capacitor "C51" to store electricity (electric charge, resonance energy) (hereinafter, referred to as "charging") and, next, the electricity (electric charge) stored in the capacitor "C51" is discharged and, in this manner, an AC current is flowed between the coil (inductor) "L51" and the capacitor "C51" (hereinafter, referred to as a "resonance"). As a result, the magnetic field generator 50 applies a mutual induction action to a coil of a skimming magnetic head to disturb its output and magnetic data acquisition by a fraudulent person is disturbed.

However, in the magnetic field generator, in a case that charging and a resonance are repeatedly and continuously performed, when charging is performed at a timing when an electric current of the coil "L51" flows in a reverse direction (capacitor is discharging) during the resonance, counter-electromotive force is generated and a power supply circuit (drive power supply part) may be damaged and, due to influence of the counter-electromotive force, charging efficiency to the capacitor "C51" is deteriorated and disturbing output intensity to a skimming magnetic head may be also deteriorated. Therefore, according to this embodiment, as described in detail below, in the magnetic field generator 50, a direction of an AC current flowing through the coil "L51" is monitored and a timing of charging in the magnetic field generation part 51 is controlled depending on a current direction flowing through the coil "L51" which is obtained by monitoring of the current direction monitoring circuit 53 for setting an appropriate timing when a DC current is flowed to the capacitor "C51" of a parallel resonance circuit to store electric charge.

In the magnetic field generator 50, during a resonance, a first direction current (normal direction current) flowing from one end side of the coil "L51" to the other end side and a second direction current (reverse direction current) flowing from the other end side to the one end side are alternately flowed through the coil "L51" which is an inductor. In this embodiment, as shown in FIG. 3, a current flowing from one end part "TP1" side of the coil "L51" to the other end part "TP2" side is referred to as a first direction current (normal direction current) "IL1", and a current flowing from the other end part "TP2" side to the one end part "TP1" side is referred to as a second direction current (reverse direction current) "IL2".

The current direction monitoring circuit 53 detects potentials of both end parts "TP1" and "TP2" of the coil "L51" and compares the levels of the potentials and outputs a compared output signal "DIR" indicating a compared result to the drive control circuit 52. In this embodiment, the current direction monitoring circuit 53 outputs, for example, a low level (L) of the compared output signal "DIR" to the drive control circuit 52 when the potential of the one end part "TP1" side of the coil "L51" is higher than the potential of the other end part "TP2" side. On the other hand, the current direction monitoring circuit 53 outputs, for example, a high level (H) of the compared output signal "DIR" to the drive control circuit 52 when the potential of the one end part "TP1" side of the coil "L51" is lower (or, not more) than the potential of the other end part "TP2" side.

The drive control circuit 52 controls a charging timing of the magnetic field generation part 51 depending on a current direction flowing through the coil "L51" which is obtained by monitoring of the current direction monitoring circuit 53. The drive control circuit 52 drives and controls to charge the magnetic field generation part 51 depending on switching of a current flowing through the coil "L51" from the second direction current "IL2" to the first direction current "IL1", for example, at a timing when the current flowing through the coil "L51" is switched to the first direction current "IL1" from the second direction current "IL2". In this manner, the magnetic field generator 50 appropriately sets a timing for flowing a DC current to the capacitor of the resonance circuit to store electric charge with a high degree of accuracy.

In a case that the magnetic field generation part 51 is charged, the drive control circuit 52 outputs an active level, for example, a high level of a charge signal "CHG" to the magnetic field generation part 51 during a predetermined charge time "Tc" which is previously set. When the charge time (period) "Tc" has elapsed, the drive control circuit 52 is switched to output a non-active level or a low level of the charge signal "CHG" to the magnetic field generation part 51 so that the magnetic field generation part 51 is driven and controlled in a resonance state.

When a previously set resonance time "Tr" has elapsed from a time when the charging is stopped (after the charge time (period) has elapsed), the drive control circuit 52 confirms that an electric current flowing through the coil "L51" is switched from the second direction current "IL2" to the first direction current "IL1" based on a monitoring result of the current direction monitoring circuit 53 and drives and controls so that the magnetic field generation part 51 is charged. In other words, in a case that the magnetic field generation part 51 is charged, the drive control circuit 52 outputs an active level, for example, a high level of the charge signal "CHG" to the magnetic field generation part 51 during a predetermined charge time "Tc" which is previously set.

The drive control circuit 52 may be structured so as to be driven and controlled that the magnetic field generation part 51 is charged in a case that a current flowing through the coil "L51" is not switched to the first direction current "IL1" even when the resonance time "Tr" has elapsed and the previously set monitoring time "Tm" has elapsed. As a result, the magnetic field generator 50 can continuously perform charging and a resonance for a desired period of time.

[First Structural Example of Drive Control Circuit]

Figure 4:
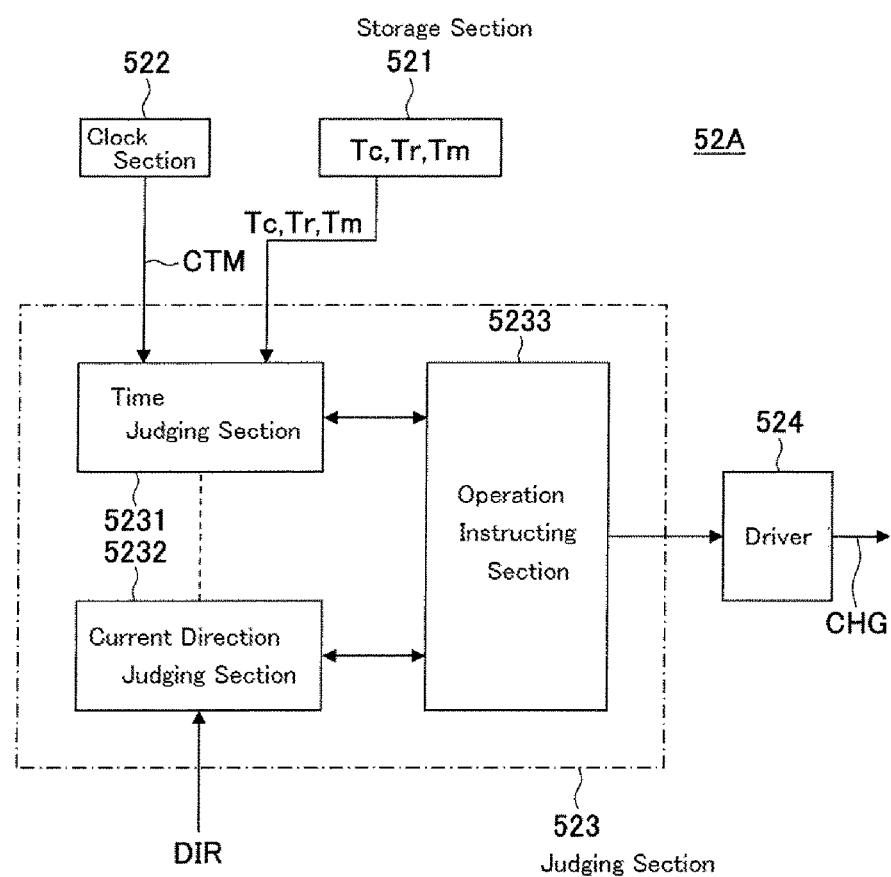
FIG. 4 is a block diagram showing a first structural example of a drive control circuit in accordance with the embodiment.

FIG. 4 is a block diagram showing a first structural example of the drive control circuit in accordance with this embodiment.

A drive control circuit 52A in FIG. 4 includes a storage section 521, a clock section 522, a judging section 523, and a driver 524 as a drive part.

The storage section 521 is, for example, structured of a nonvolatile memory and is stored with various data, i.e., a charge time (period) "Tc", a resonance time (period) "Tr" and a monitoring time (period) "Tm" which are previously set. Various data of the charge time (period) "Tc", the resonance time (period) "Tr" and the monitoring time (period) "Tm" stored in the storage section 521 are referred in the judging section 523. The clock section 522 supplies current time information "CTM" to the judging section 523.

The judging section 523 is structured so as to include a time (period) judging section 5231, a current direction judging section 5232 and an operation instructing section 5233.

The operation instructing section 5233 of the judging section 523 basically instructs and controls operations of the time judging section 5231, the current direction judging section 5232 and the driver 524. The operation instructing section 5223 controls an output timing of the charge signal "CHG" which is outputted from the driver 524 depending on elapsed information's of the charge time (period) "Tc", the resonance time (period) "Tr" and the monitoring time (period) "Tmin", and a current direction flowing through the coil "L51".

The time judging section 5231 judges whether the charge time (period) "Tc", the resonance time (period) "Tr" and the monitoring time (period) "Tm" stored in the storage section 521 have elapsed or not based on a current time "CTM" supplied from the clock section 522 depending on operation instructing information of the operation instructing section 5233, and the result is supplied to the operation instructing section 5233. Further, the time judging section 5231 supplies information and the like indicating that the resonance time "Tr" has elapsed to the current direction judging section 5232. It may be structured that the information indicating that the resonance time "Tr" has elapsed is supplied to the current direction judging section 5232 through the operation instructing section 5233.

When the current direction judging section 5232 receives information indicating that the resonance time "Tr" has elapsed, the current direction judging section 5232 judges whether the current flowing through the coil "L51" is switched from the second direction current "IL2" to the first direction current "IL1" or not and the result is supplied to the operation instructing section 5233.

When a disturbing magnetic field is generated, first, the operation instructing section 5233 instructs the driver 524 to output an active level or a high level of the charge signal "CHG" for starting charging. The operation instructing section 5233 notifies that start of charging has been instructed to the time judging section 5231 and the current direction judging section 5232. When the operation instructing section 5233 recognizes that the charge time (period) "Tc" has elapsed through information from the time judging section 5231, the operation instructing section 5233 instructs the driver 524 to switch the charge signal "CHG" to a non-active level or a low level for driving and controlling the magnetic field generation part 51 in a resonance state. The operation instructing section 5233 recognizes that the resonance time "Tr" has elapsed through information from the time judging section 5231 and, when it is confirmed that a current flowing through the coil "L51" is switched from the second direction current "IL2" to the first direction current "IL1" based on a judging result of the current direction judging section 5232, the operation instructing section 5233 instructs the driver 524 to output an active level or a high level of the charge signal "CHG". When the operation instructing section 5233 recognizes that the resonance time "Tr" has elapsed and, in addition, the monitoring time "Tm" has elapsed based on information of the time judging section 5231, the operation instructing section 5233 forcibly instructs the driver 524 to output an active level or a high level of the charge signal "CHG".

The first structural example of the drive control circuit 52 in this embodiment is structured as described above.

The drive control circuit 52 in this embodiment may adopt a second structural example as described below in addition to the function of the first structural example, or separately from the first structural example.

[Second Structural Example of Drive Control Circuit]

In a second structural example, the drive control circuit 52 may be structured so that, in a case that a current flowing through the coil "L51" is switched to the first direction current "IL1" based on a monitoring result of the current direction monitoring circuit 53 within a previously set charge time (period) "Tc" after charging is started, a resonance is started after the charging period is finished and, alternatively, in a case that a current flowing through the coil "L51" is not switched to the first direction current "IL1" within the charge time (period) "Tc", drive and control of the magnetic field generation part is terminated as an abnormality. According to this structure, the magnetic field generator 50 is capable of performing charging and a resonance in a case of a normal state.

Further, the drive control circuit 52 acquires the number of times of inversion of the current flowing through the coil "L51" within the previously set resonance time (period) "Tc" after a resonance is started based on a monitoring result of the current direction monitoring circuit 53 and, when the acquired number of times "N" of the inversion is not less than a predetermined number of times "Nc", the drive control circuit 52 drives and controls the magnetic field generation part 51 depending on the current flowing through the coil "L51" based on a monitoring result of the current direction monitoring circuit 53 within the previously set monitoring time "Tm". Specifically, similarly to the first structural example, when the previously set resonance time "Tr" has elapsed after charging is stopped (after charging period has elapsed), the drive control circuit 52 confirms that a current flowing through the coil "L51" is switched from the second direction current "IL2" to the first direction current "IL1" based on a monitoring result of the current direction monitoring circuit 53 and drives and controls the magnetic field generation part 51 so as to perform charging. In other words, in order to charge the magnetic field generation part 51, the drive control circuit 52 outputs an active level, for example, a high level of the charge signal "CHG" to the magnetic field generation part 51 during a predetermined charge time "Tc" previously set. In this manner, the magnetic field generator 50 appropriately sets a timing for flowing a DC current to the capacitor of the resonance circuit to store electric charge with a further high degree of accuracy.

When the acquired number of times "N" of inversion does not reach a predetermined number of times "Nc" within the resonance period "Tc", the drive control circuit 62 terminates drive and control of the magnetic field generation part as an abnormality. Further, in a case that, even when the previously set monitoring time "Tm" has elapsed, a current flowing through the coil "L51" is not switched to the first direction current, the drive control circuit 62 terminates drive control of the magnetic field generation part as an abnormality without controlling so as to charge the magnetic field generation part. As a result, the magnetic field generator 50 can perform drive control of charging and a resonance in a case of a normal state, in other words, in a case that it is judged that a direction of a current flowing through the coil "L51" is normally switched during charging or during the resonance.

Figure 5:
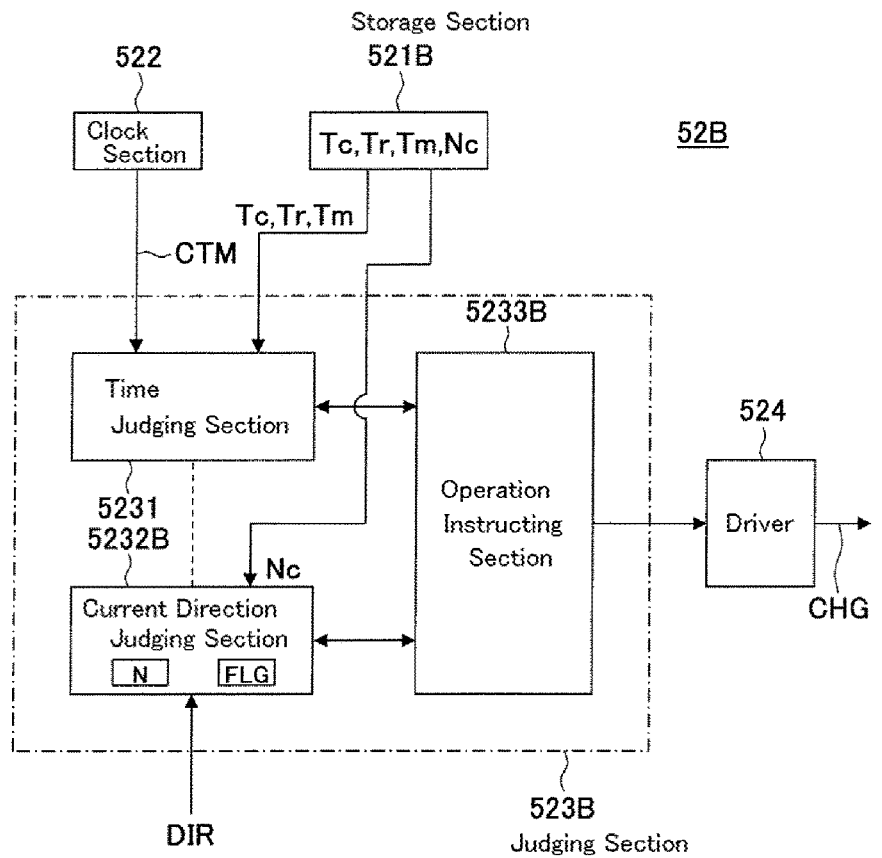
FIG. 5 is a block diagram showing a second structural example of a drive control circuit in accordance with the embodiment.

FIG. 5 is a block diagram showing a second structural example of a drive control circuit in accordance with this embodiment.

A drive control circuit 52B in FIG. 5 is different from the drive control circuit 52A in FIG. 4 as described below.

A storage section 521B stores a predetermined number of times "Nc" of the number of times of inversion of a current direction in addition to the various data of the charge time (period) "Tc", the resonance time (period) "Tr" and the monitoring time (period) "Tm" which are previously set. The various data of the charge time (period) "Tc", the resonance time (period) "Tr" and the monitoring time (period) "Tm" stored in the storage section 521B are referred in the time judging section 5231 of the judging section 523. The predetermined number of times "Nc" which is stored in the storage section 521B is referred in a current direction judging section 5232B.

The charge time "Tc" and the resonance time "Tr" are arbitrarily determined according to a control method of a disturbing magnetic field. For example, the charge time "Tc" is set to be 100 μs to 700 μs and the resonance time "Tr" is set to be 1000 μs to 2000 μs. Further, the monitoring time "Tm" is also arbitrarily determined on the basis of a resonance cycle (1/resonance frequency) of the parallel resonance circuit. The monitoring time "Tm" is, for example, set to be 100 μs to 200 μs.

When the current direction judging section 5232B receives information indicating that the charge time "Tc" has not elapsed, the current direction judging section 5232B judges whether the current flowing through the coil "L51" is switched from the second direction current "IL2" to the first direction current "IL1" or not and the result is supplied to the operation instructing section 5233B. When the current direction judging section 5232B receives information indicating that the resonance time "Tr" has not elapsed, the current direction judging section 5232B switches a flag "FLG" of a coil current direction between "0" and "1" within the resonance time (period) "Tr" and counts the number of times "N" of a current direction and supplies the result to the operation instructing section 5233B. When the current direction judging section 5232B receives information indicating that the resonance time "Tr" has elapsed, the current direction judging section 5232b judges whether the current flowing through the coil "L51" is switched from the second direction current "IL2" to the first direction current "IL1" or not and the result is supplied to the operation instructing section 5233B.

When a disturbing magnetic field is generated, first, in order to start charging, the operation instructing section 5233B instructs the driver 524 to output an active level or a high level of the charge signal "CHG". The operation instructing section 5233B notifies that start of charging has been instructed to the time judging section 5231 and the current direction judging section 5232. In a case that a current flowing through the coil "L51" is the first direction current "IL1" based on a monitoring result of the current direction monitoring circuit 53 within the charge time "Tc", the operation instructing section 5233B instructs to switch the driver 524 to a non-active level or a low level of the charge signal "CHG" at a time when the charge time "Tc" has elapsed in order to perform drive control of the magnetic field generation part 51 in a resonance state. In a case that a current flowing through the coil "L51" does not become the first direction current "IL1" (when not switched) within the charge time "Tc", the operation instructing section 5233B terminates drive control of the magnetic field generation part as an abnormality. When the operation instructing section 5233B recognizes that the charge time "Tc" has elapsed through information from the time judging section 5231, the operation instructing section 5233B instructs the driver 524 to switch the charge signal "CHG" to a non-active level or a low level for performing drive control of the magnetic field generation part 51 in a resonance state. In a case that the acquired number of times "N" of inversion is not less than the predetermined number of times "Nc" within the resonance time "Tr", the operation instructing section 5233B recognizes that the resonance time "Tr" has elapsed through information of the time judging section 5231 and, when it is confirmed that a current flowing through the coil "L51" is switched from the second direction current "IL2" to the first direction current "IL1" based on a judging result of the current direction judging section 5232B, the operation instructing section 5233B instructs the driver 524 to output an active level or a high level of the charge signal "CHG". In a case that the acquired number of times "N" of inversion does not reach the predetermined number of times "Nc" within the resonance time "Tr" and, in a case that, even when the monitoring time "Tm" has elapsed through information of the time judging section 5231, a current flowing through the coil "L51" is not switched from the second direction current "IL2" to the first direction current "IL1", the operation instructing section 5233B terminates drive control of the magnetic field generation part as an abnormality.

As described above, the first structural example and the second structural example of the drive control circuit 52 in this embodiment have been described. Operation examples of the first structural example and the second structural example will be described below in association with flow charts.

[Arrangement Example of Magnetic Field Generator]

An AC current or a DC current is flowed through the coil "CL" of the magnetic field generator 50 under control of the drive control circuit 52 which is collectively controlled by the control section 40. The magnetic field generator 50 is structured and disposed so that a disturbing magnetic field is generated in an outside portion of the opening 21 or the card insertion part 31 when a current is flowed. The magnetic field generator 50 is structured so that a generating region of a disturbing magnetic field is a region including a passing region of a magnetic stripe "mp" formed on a magnetic card "MC" which is inserted or ejected through the card insertion part 31.

A circuit arrangement of the magnetic field generator 50 having the structure as described above may be, as shown in FIG. 1, disposed so that the magnetic field generation part 51, the drive control circuit 52 and the current direction monitoring circuit 53 are disposed in the vicinity of an inner side (rear face side) of the front panel 20 together with the entire circuit. However, various structures may be adopted, for example, the resonance part as the magnetic field generation part 51 structured of the coil (inductor) "L51" and the capacitor "C51" is disposed in the vicinity of an inner side of the front panel 20 and remaining circuits are disposed at other positions, for example, on the control section 40.

Figure 6:
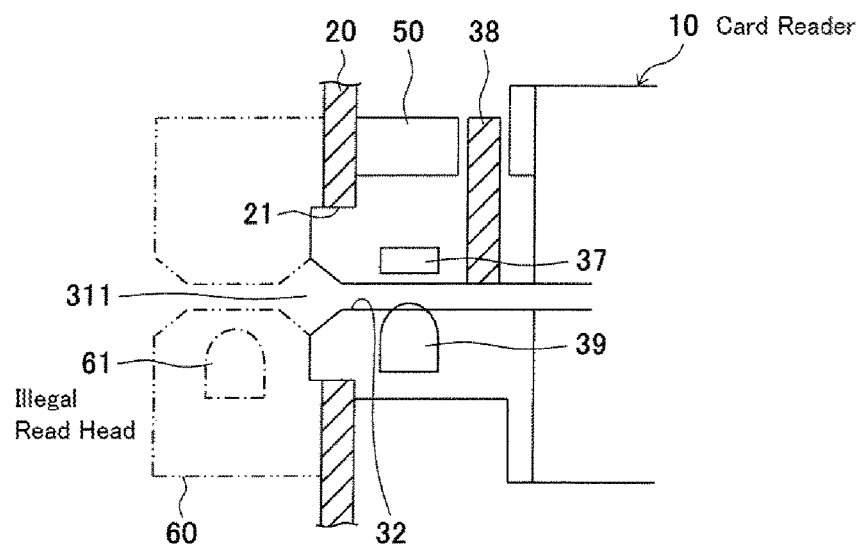
FIG. 6 is a schematic view showing a state that a skimming magnetic head device is attached to an outside of the device.

FIG. 6 is a schematic view showing a state that a skimming magnetic head (skimmer including a skimming magnetic head) is attached to an outside of the device.

In the card reader 10, when a card "MC" is inserted, the card "MC" is conveyed at a constant speed by the conveying roller 331 at the same time when a tip end is inserted into the card insertion port 311. Similarly, when the magnetic card "MC" is to be ejected, the magnetic card "MC" is conveyed at a constant speed by the conveying roller 331 until the magnetic card "MC" is substantially ejected to the outside from the card insertion port 311.

Therefore, in a case that a skimmer (a device for illegally reading data of a magnetic card) including a skimming magnetic head and a magnetic reading circuit is attached to an outer side of the card insertion port 311, a card is moved at a constant speed along the skimming magnetic head. Accordingly, recorded data of a card can be read by the magnetic head attached to an outer side of the card slot.

In the card reader 10 in accordance with this embodiment, for example, as shown in FIG. 6, even when a skimmer 60 including a skimming magnetic head 61 is illegally attached to a surface of the front panel 20 which is formed with the opening 21 for a card slot, reading operation of a card "MC" by the skimming magnetic head 61 can be prevented through a disturbing magnetic field by the magnetic field generator 50.

In other words, in the magnetic field generator 50 in this embodiment, a disturbing magnetic field can be continuously generated and a timing for storing electric charge by flowing a DC current to the capacitor "C51" of the parallel resonance circuit can be set appropriately by monitoring a direction of an AC current flowing through the coil which is an inductor and, in addition, a disturbing magnetic field can be controlled with a satisfactory energy efficiency. Further, in the magnetic field generator 50, malfunction due to damage of a resonance circuit element and disconnection of the coil can be detected by always monitoring a current state of the coil which is an inductor and thus reliability of the disturbing magnetic field generator can be improved. Further, in the magnetic field generator 50, the current direction monitoring circuit 43 can be realized by adding a comparator circuit element.

Next, further specific structure and function of the magnetic field generator 50 having the above-mentioned characteristic effects will be described below.

[Structural Examples of Magnetic Field Generation Part 51, Drive Control Circuit 52, Current Direction Monitoring Circuit 53 of Magnetic Field Generator 50]

Next, specific circuit structures and operations of the magnetic field generation part 51, the drive control circuit 52 and the current direction monitoring circuit 53 of the magnetic field generator 50 will be described in detail below as an embodiment. In the following descriptions, the drive control circuit 52 will be described about a drive circuit system except the structures shown in FIGS. 4 and 5. In the following descriptions, a resonance part 511 structuring the magnetic field generation part 51 of the magnetic field generator 50 in accordance with this embodiment which is described in association with FIG. 7 basically includes an LC parallel resonance circuit which is formed by connecting a coil "L" which is an inductor and a capacitor "C", and the resonance part 511 has a function for continuously generating a magnetic field by the LC parallel resonance circuit.

In addition, in this embodiment, the magnetic field generation part 51 having the LC parallel resonance circuit has a function for generating a magnetic field stronger than a conventional one having only a coil. As a result, the magnetic field generator 50 is capable of increasing an output of a disturbing magnetic field and continuously generating a magnetic field over a predetermined time period, and is capable of continuously generating a disturbing magnetic field with an appropriate time period and intensity and thus illegal acquisition of magnetic data by a skimming magnetic head can be surely prevented.

In addition, in this embodiment, a timing for charging in the magnetic field generation part 51 is controlled depending on a current direction flowing through the coil "L51" obtained by monitoring of the current direction monitoring circuit 53. As described above, in this embodiment, a timing for storing electric charge by flowing a DC current to the capacitor "C51" of the parallel resonance circuit can be set appropriately in the magnetic field generator 50 by monitoring a direction of an AC current flowing through the coil "L51". Therefore, a disturbing magnetic field can be controlled efficiently with a high degree of accuracy and illegal acquisition of magnetic data by using a skimming magnetic head can be surely prevented. Further, in the magnetic field generator 50, malfunction due to damage of a resonance circuit element and disconnection of the coil can be detected by always monitoring a current state of the coil which is an inductor and thus reliability of the disturbing magnetic field generator can be improved.

[Embodiment of Magnetic Field Generator]

Next, a structure of a magnetic field generation part and the like of a magnetic field generator in accordance with this embodiment will be described below.

Figure 7:
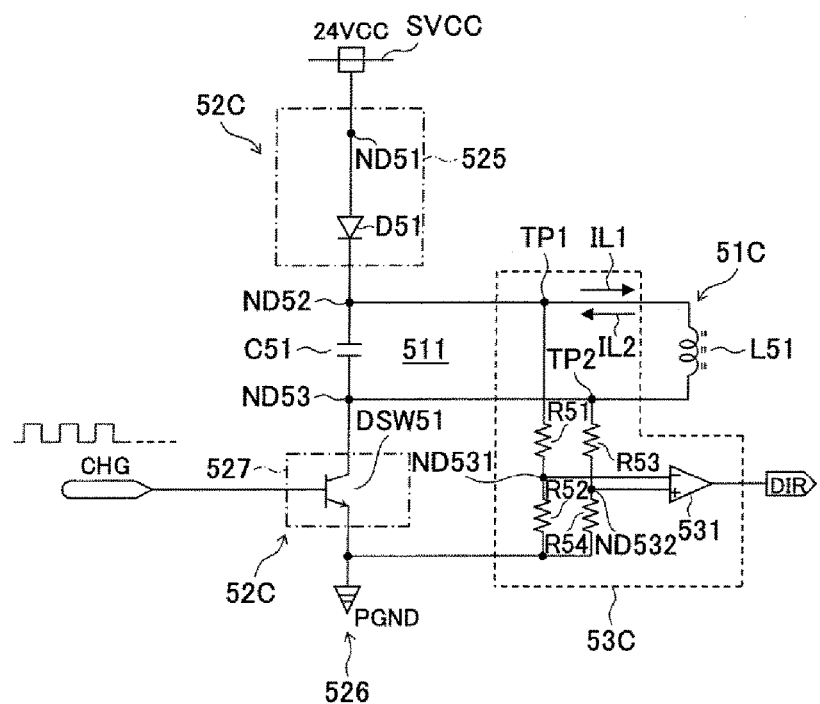
FIG. 7 is a circuit diagram showing a magnetic field generation part, a drive control circuit and a current direction monitoring circuit of a magnetic field generator in accordance with an embodiment of the present invention.

FIG. 7 is a circuit diagram showing a magnetic field generation part, a drive control circuit and a current direction monitoring circuit of a magnetic field generator in accordance with an embodiment of the present invention.

A magnetic field generator 50C in FIG. 7 basically includes a resonance part 511 structuring a magnetic field generation part 51C, a drive power supply part (power supply circuit) 525 for supplying a drive power supply voltage "VCC" as a drive control circuit 52C, a reference potential part 526, a resonance drive part 527, and a current direction monitoring circuit 53C.

In this embodiment, a "VCC" (hereinafter, referred to as a drive voltage) supplied by the drive power supply part 525 is set in 24V or 20V. The drive power supply part 525 supplies a drive voltage "VCC" to the resonance part 511 through a connection node "ND51" connected with a supply source "SVCC" for the drive voltage "VCC" as a power supply circuit. In the drive power supply part 525, a back-flow prevention diode "D51" is connected between the connection node "ND51" and a power input node (first node "ND52") of the resonance part 511. The diode "D51" is connected in the forward direction from the connection node "ND51" to the first node "ND52" of the resonance part 511. In other words, an anode of the diode "D51" is connected with the connection node "ND51" and its cathode is connected with the first node "ND52" of the resonance part 511.

The reference potential part 526 is set to be a reference potential "VSS". In this embodiment, the reference potential is a ground potential "GND".

The resonance part 511 is structured so as to include a parallel resonance circuit in which a coil "L51" which is an inductor and a capacitor "C51" are parallelly connected with each other between the first node "ND52" and a second node "ND53". In the resonance part 511, a drive voltage "VCC" is supplied to the first node "ND52" and the second node "ND53" is electrically connected with the reference potential part 526, and the resonance part 511 resonates in a state that the reference potential part 526 is electrically separated and generates a magnetic field depending on a current flowing through the coil "L51". In other words, the resonance part 511 is structured so as to generate a disturbing magnetic field for a skimming magnetic head to prevent magnetic data from being illegally acquired.

In this embodiment, a resonance circuit is, as shown as one example in FIG. 7, structured of an LC parallel resonance circuit in which an inductor "L51" and a capacitor "C51" are connected in parallel with each other between the first node "ND52" and the second node "ND53".

One end part "TP1" of the coil "L51" that is an inductor is connected with the first node "ND52", and the other end part "TP2" of the coil "L51" is connected with the second node "ND53". One electrode (terminal) of the capacitor "C51" is connected with the first node "ND52" and the other electrode (terminal) is connected with the second node "ND53". The first node "ND52" is connected with a supply line of a drive voltage "VCC" of the drive power supply part 525. The second node "ND53" is selectively connected with the reference potential part 526 through a drive switching element "DSW51" for large power of the resonance drive part 527.

In the LC parallel resonance circuit, respective currents of LC cancel each other and impedance is considered to be infinite in the resonance frequency viewed from the outside. In this case, energy stored as an electric field in an inside of the capacitor "C51" and energy stored as a magnetic field in an inside of the coil "L51" that is an inductor are moved each other in an inside of the parallel resonance circuit. In this embodiment, the resonance part 511 is controlled so as to periodically and continuously resonate by a charge signal "CHG" which is a pulse-shaped control signal through the resonance drive part 527.

The pulse-shaped charge signal "CHG" is driven and controlled so that the resonance part 511 which is the magnetic field generation part 51 is charged when a predetermined resonance time "Tr" has elapsed from a time when the charging is stopped (after the charge time period has elapsed) and, when it is confirmed that an electric current flowing through the coil "L51" is switched from the second direction current "IL2" to the first direction current "IL1" based on a monitoring result of the current direction monitoring circuit 53. In this embodiment, when the resonance part 511 of the magnetic field generation part 51 is to be charged, an active level, for example, a high level of the charge signal "CHG" is supplied during a predetermined charge time "Tc" which is previously set.

In the resonance part 511, a connecting state and a non-connecting state between the second node "ND53" and the reference potential part 526 are switched through the resonance drive part 527 and resonance is induced and controlled so as to generate a magnetic field. Further, the resonance part 511 is controlled so as not to generate a disturbing magnetic field (magnetic field generation is stopped) through the resonance drive part 527 during a time period longer than the above-mentioned period from when a card "MC" is inserted into the card insertion port 311 and the card "MC" is detected by the card width sensor 371 and until generated magnetic field becomes such a degree that a function as a disturbing magnetic field cannot maintain or the generated magnetic field disappears. The control section 40 judges whether the pre-head 39 detects magnetism or not in a predetermined period when generation of the disturbing magnetic field is stopped.

The period means a period that, after resonance operation is induced and a magnetic field is generated, the magnetic field attenuates together with attenuation of resonance energy accumulated in the resonance part, but resonance can be induced during the attenuating magnetic field maintains a function as a disturbing magnetic field.

The resonance drive part 527 is controlled so that a connecting state and a non-connecting state between the second node "ND53" of the resonance part 511 and the reference potential part 526 are switched depending on the charge signal "CHG" from the control section 40 (driver 524 of the drive control circuit 52) and resonance is induced to generate a magnetic field. Further, the resonance drive part 527 is controlled so as not to generate a disturbing magnetic field during a time period longer than the above-mentioned period that the generated magnetic field becomes such a degree that it cannot maintain a function as a disturbing magnetic field by switching periodically and/or non-periodically in a non-connecting state between the second node "ND53" of the resonance part 511 and the reference potential part 526 depending on the charge signal "CHG".

The resonance drive part 527 in this embodiment is structured so as to include a drive switching element "DSW51" for large power which is, for example, formed of a transistor in a bipolar type or the like. In an example in FIG. 7, the drive switching element "DSW51" is formed of an "npn" type bipolar switch. Its collector is connected with the second node "ND53" of the resonance part 511, its emitter is connected with the reference potential part 526 and its base is connected with a supply line of the charge signal "CHG".

As described above, the drive switching element "DSW51" is connected between the second node "ND53" of the resonance part 511 and the reference potential part 526 and is switched to a conductive state and a non-conductive state depending on the charge signal "CHG", and a connecting state and a non-connecting state of the second node "ND53" of the resonance part 511 with the reference potential part 526 are switched.

When the resonance drive part 527 receives, for example, an active high level of the charge signal "CHG", the resonance drive part 527 drives the drive switching element "DSW51" in a conductive state. When the resonance drive part 527 receives a non-active low level of the charge signal "CHG", the resonance drive part 527 drives the drive switching element "DSW51" in a non-conductive state.

[Structural Example of Current Direction Monitoring Circuit]

Next, a specific structural example of the current direction monitoring circuit 53C which monitors a current direction flowing through the coil "L51" structuring the resonance part 511 will be described below.

The current direction monitoring circuit 53C detects potentials of both end parts "TP1" and "TP2" of the coil "L51", compares their levels of the potentials and outputs a compared output signal "DIR" to the drive control circuit 52 (52A, 52 B) as shown in FIGS. 3, 4 and 5. In this embodiment, when the potential of one end part "TP1" side of the coil "L51" is higher than the potential of the other end part "TP2" side, the current direction monitoring circuit 53C outputs, for example, a low level (L) of the compared output signal "DIR" to the drive control circuit 52. On the other hand, when the potential of one end part "TP1" side of the coil "L51" is lower (or not more) than the potential of the other end part "TP2" side, the current direction monitoring circuit 53C outputs, for example, a high level (H) of the compared output signal "DIR" to the drive control circuit 52.

The current direction monitoring circuit 53C includes, as shown in FIG. 7, resistance elements "R51", "R52", "R53" and "R54" and a comparator 531. The resistance elements "R51" and "R52" are serially-connected between one end part "TP1" of the coil "L51" of the resonance part 511 and the reference potential part 526. A connection node "ND531" of the serially-connected resistance elements "R51" and "R52" is connected with an inverting input terminal (−) of the comparator 531. The resistance elements "R53" and "R54" are serially-connected between the other end part "TP2" of the coil "L51" of the resonance part 511 and the reference potential part 526. A connection node "ND532" of the serially-connected resistance elements "R53" and "R54" is connected with a non-inverting input terminal (+) of the comparator 531.

The comparator 531 compares a potential of the connection node "ND531" and a potential of the connection node "ND532", in other words, a potential of one end part "TP1" side of the coil "L51" and a potential of the other end part "TP2" side. When the potential of the one end part "TP1" side of the coil "L51" is higher than the potential of the other end part "TP2" side, the comparator 531 outputs, for example, a low level (L) of the compared output signal "DIR" to the drive control circuit 52. When the potential of the one end part "TP1" side of the coil "L51" is lower (or not more) than the potential of the other end part "TP2" side, the comparator 531 outputs, for example, a high level (H) of the compared output signal "DIR" to the drive control circuit 52.

The drive control circuit 52 as shown in FIGS. 3, 4 and 5 receives the compared output signal "DIR" of the comparator 531 and controls a timing for charging of the magnetic field generation part 51. As described above, when a current flowing through the coil "L51" is switched from the second direction current "IL2" to the first direction current "IL1", for example, at a timing that a current flowing through the coil "L51" is switched from the second direction current "IL2" to the first direction current "IL1", the drive control circuit 52 drives and controls the magnetic field generation part 51 so as to perform charging. In this manner, the magnetic field generator 50 appropriately sets a timing for flowing a DC current to the capacitor of the resonance circuit to store electric charge with a high degree of accuracy.

Next, operation of the magnetic field generator 50C in accordance with this embodiment will be described below in association with FIGS. 8, 9 and 10.

Figure 8:
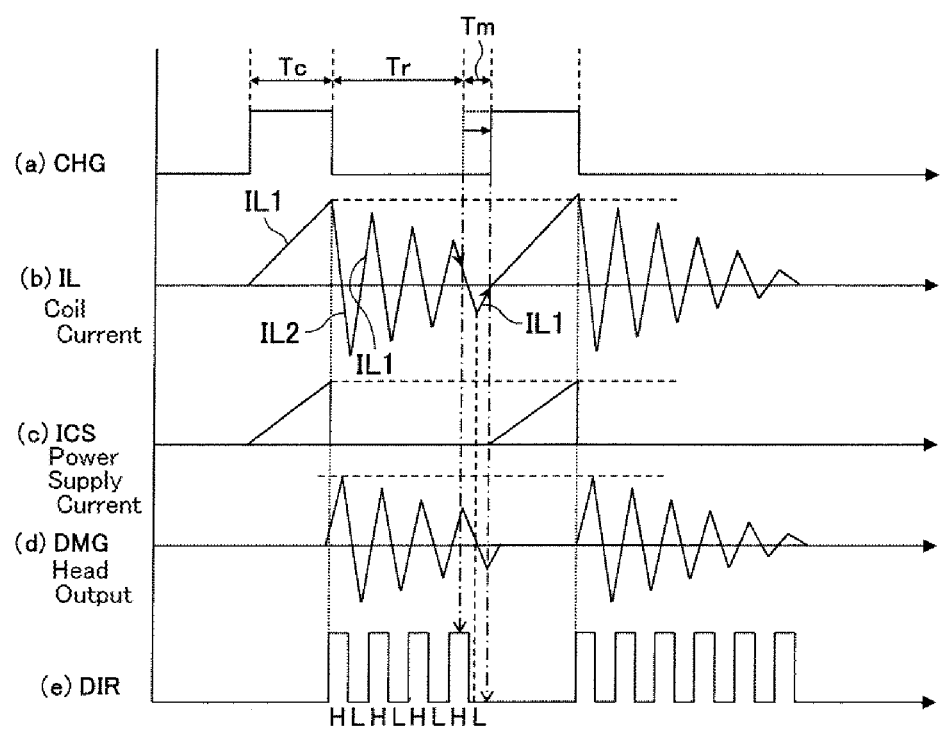
FIG. 8 is a waveform diagram for explaining operation of a magnetic field generator in accordance with the embodiment.

FIG. 8 is a waveform diagram for explaining operation of a magnetic field generator in accordance with this embodiment. FIG. 8 shows waveforms when the magnetic field generator 50C in FIG. 7 is mounted on the card reader 10 in FIG. 1. FIG. 8(a) indicates a charge signal "CHG", FIG. 8(b) indicates a coil current "IL" (1, 2), FIG. 8(c) indicates a power supply current "ICS", FIG. 8(d) indicates a disturbing magnetic field "DMG" which is a head output, and FIG. 8(e) indicates a compared output signal "DIR". Further, FIG. 9 is a flow chart for explaining operation in a case that the first structural example in FIG. 4 is adopted as a drive control circuit. FIG. 10 is a flow chart for explaining operation in a case that the second structural example in FIG. 5 is adopted as a drive control circuit.

[Operation Example when Drive Control Circuit of First Structural Example is Adopted]

First, operation when the first structural example in FIG. 4 is adopted as a drive control circuit will be described below in association with FIGS. 8 and 9.

First, in a state that a disturbing magnetic field is not generated, as shown in FIG. 8(a), a charge signal "CHG" is supplied from the driver 524 of the drive control circuit 52 of the control section 40 to the resonance drive part 527 of the drive control circuit 52A of the magnetic field generator 50C so as to generate a disturbing magnetic field. In this case, the charge signal "CHG" is supplied in an active high level (H). When the resonance drive part 527 receives the active high level of the charge signal "CHG", the drive switching element "DSW51" is driven in a conductive state. As a result, charging is started (step ST1 in FIG. 9). In this case, the time judging section 5231 of the drive control circuit 52A stores a current time "CTM1" of a charging start point supplied from the clock section 522 in a memory not shown at the time when the charging is started (step ST2 in FIG. 9).

In the resonance part 511, the second node "ND53" is set in an electrically connecting state with the reference potential part 526. In the resonance part 511, a drive voltage "VCC" is supplied to the first node "ND52" from the drive power supply part 525. In other words, in the resonance part 511, the second node "ND53" and the reference potential part 526 are switched to a connecting state through the resonance drive part 527 and thus charging to the capacitor "C51" is started and a resonance function is induced. As a result, as shown in FIG. 8(b), the resonance part 511 is controlled so that a first current "IL1" in a normal direction flowing through the coil (inductor) "L51" is increased and a disturbing magnetic field is generated.

In this case, the time judging section 5231 of the drive control circuit 52A judges whether a difference between a current time "CTM2" and the time "TMC1" of the charging start point stored in the step ST2 exceeds a predetermined charge time "Tc" or not (step ST3 in FIG. 9) and the result is supplied to the operation instructing section 5233. When the operation instructing section 5233 recognizes that, based on a judging result of the time judging section 5231, the predetermined charge time "Tc" has elapsed after charging is started (step ST3 in FIG. 9), the operation instructing section 5233 instructs the driver 524 to switch the charge signal "CHG" to a non-active level or a low level in order to control the magnetic field generation part 51 in a resonance state. As a result, the charge signal "CHG" is switched to a non-active level or a low level and supplied to the resonance drive part 527. When the resonance drive part 527 receives a non-active low level of the charge signal "CHG", the drive switching element "DSW51" is driven in a non-conductive state. As a result, the charging is stopped and a resonance is started (step ST4 in FIG. 9). In this embodiment, when a current flowing through the coil (inductor) "L51" is switched to the first direction current "IL1" in a normal direction during the charge time "Tc" based on a judging result of the time judging section 5231, the operation instructing section 5233 starts a resonance after the charge time "Tc" is finished.

Figure 9:
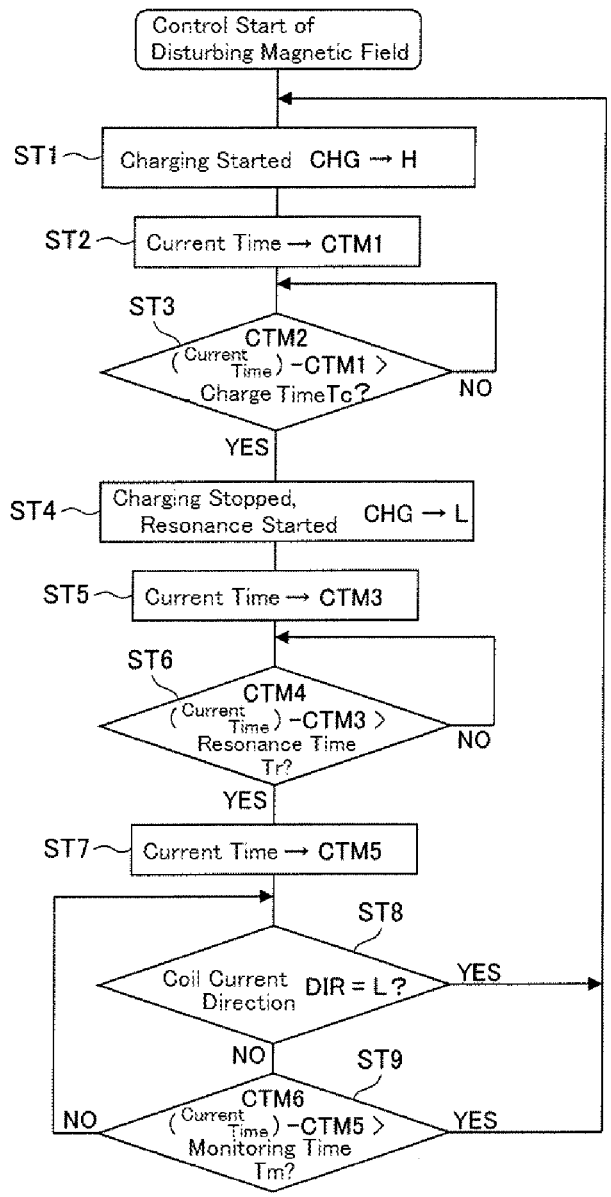
FIG. 9 is a flow chart for explaining operation in a case that the first structural example in FIG. 4 is adopted as a drive control circuit.

The time judging section 5231 of the drive control circuit 52A stores a current time "CTM3" of the resonance start point supplied from the clock section 522 in a memory not shown at a time when the resonance is started (step ST5 in FIG. 9).

The time judging section 5231 of the drive control circuit 52A judges that a difference between a current time "CTM4" and the time "TMC3" stored in the step ST5 exceeds a predetermined resonance time "Tr" or not (step ST6 in FIG. 9) and the result is supplied to the operation instructing section 5233. When the operation instructing section 5233 recognizes that a predetermined resonance time "Tr" has elapsed after the resonance is started based on a judging result of the time judging section 5231 (step ST6 in FIG. 9), the operation instructing section 5233 stores a current time "CTM5" supplied from the clock section 522 in a memory not shown at a time when the resonance time "Tr" has elapsed (step ST7 in FIG. 9).

Then, the operation instructing section 5233 confirms that current flowing through the coil "L51" is switched from the second direction current "IL2" to the first direction current "IL1" based on a judging result of the current direction judging section 5232 (step ST8 in FIG. 9). In the step ST8, when it is confirmed that a current flowing through the coil "L51" is switched from the second direction current "IL2" to the first direction current "IL1", the operation instructing section 5233 instructs the driver 524 to output in an active level or a high level of the charge signal "CHG". In this case, the flow is returned to the processing in the step ST1 and an active and high level (H) of the charge signal "CHG" is supplied. When the resonance drive part 527 receives an active and high level of the charge signal "CHG", the drive switching element "DSW51" is driven in a conductive state.

In the resonance part 511, the second node "ND53" is set in an electrically connecting state with the reference potential part 526. In the resonance part 511, the drive voltage "VCC" is supplied to the first node "ND52" from the drive power supply part 525. In other words, in the resonance part 511, the second node "ND53" and the reference potential part 526 are switched to a connecting state through the resonance drive part 527 and thus charging to the capacitor "C51" is started and a resonance function is induced. As a result, as shown in FIG. 8(b), the resonance part 511 is controlled so that a first current "IL1" in a normal direction flowing through the coil (inductor) "L51" is increased and a disturbing magnetic field is generated. In other words, charging is started again at a timing when a current flowing through the coil "L51" is switched to a normal direction (first electric current direction) and thus a disturbing magnetic field is generated with a satisfactory charging efficiency.

In the step ST8, when it is not confirmed that a current flowing through the coil "L51" is switched from the second direction current "IL2" to the first direction current "IL1", the time judging section 5231 of the drive control circuit 52A judges whether a difference between a current time "CTM6" and the time "TMC5" stored in the step ST7 exceeds a predetermined monitoring time "Tm" or not (step ST9 in FIG. 9) and the result is supplied to the operation instructing section 5233. The operation instructing section 5233 repeats the processing of the step 8 until a predetermined monitoring time "Tr" has elapsed after the resonance is started based on a judging result of the time judging section 5231. On the other hand, when the operation instructing section 5233 recognizes that a predetermined monitoring time "Tm" has elapsed after the resonance is started based on a judging result of the time judging section 5231 (step ST9 in FIG. 9), the operation instructing section 5233 forcibly instructs the driver 524 to output an active level or a high level of the charge signal "CHG". In other words, also in this case, the processing from the step ST1 is repeated.

At the time of the resonance, the second node "ND53" of the resonance part 511 is electrically separated from the reference potential part 526. However, the current "IL" of the coil (inductor) "L51" is flowed in the resonance part 511 by the induced resonance energy while being attenuated and generation of a disturbing magnetic field is continued while being attenuated together with the current "IL".

The drive control circuit 52A of the control section 40 supplies, for example, a pulse-shaped charge signal "CHG" to the resonance drive part 527 and then resonance operation is induced in the resonance part 511 and, after a magnetic field is generated, the magnetic field attenuates together with attenuation of the resonance energy. However, the control section 40 supplies an active or high level (H) of the charge signal "CHG" to the resonance drive part 527 at a constant time period and/or non-periodically (random) from the previous output (supply) in order to induce a resonance while the attenuating magnetic field maintains a function as a disturbing magnetic field.

In other words, similarly to the above-mentioned example, as shown in FIGS. 8(a) through 8(d), an active or a high level (H) of the charge signal "CHG" is supplied from the control section 40 to the resonance drive part 527 of the drive control circuit 52A so that a magnetic field is generated again. When the resonance drive part 527 receives an active high level of the charge signal "CHG", the drive switching element "DSW51" is driven in a conductive state.

As a result, in the resonance part 511, the second node "ND53" is set in an electrically connecting state with the reference potential part 526. In the resonance part 511, the drive voltage "VCC" is supplied to the first node "ND52" from the drive power supply part 525. In other words, the resonance part 511 is controlled so that the second node "ND53" and the reference potential part 526 is switched in a connecting state through the resonance drive part 527 and thus a resonance function is induced again and a current flowing through the coil (inductor) "L51" is increased to generate a magnetic field.

The pulse-shaped charge signal "CHG" is switched to a non-active low level (L) and supplied to the resonance drive part 527. When the resonance drive part 527 receives a non-active low level of the charge signal "CHG", the drive switching element "DSW51" is driven in a non-conductive state.

In this case, the second node ND53 of the resonance part 511 is electrically separated from the reference potential part 526. However, a current of the coil (inductor) "L51" is flowed in the resonance part 511 by the induced resonance energy while being attenuated and generation of a disturbing magnetic field is continued while being attenuated together with the current.

The above-mentioned operation is repeatedly performed during a period when a disturbing magnetic field is generated.

As described above, in the card reader 10 on which the magnetic field generator 50C in this embodiment is mounted, a disturbing magnetic field is generated for a skimming magnetic head which is illegally attached to the card insertion port 311 and magnetic data can be prevented from being read.

In the card reader 10 on which the magnetic field generator 50C in this embodiment is mounted, when a card is detected by the card width sensor 371 as a card detection sensor in a case that a disturbing magnetic field is generated by the resonance part (parallel resonance circuit) 511, the generation of the disturbing magnetic field is required to be stopped because magnetic detection is required to perform by the pre-head 39. Therefore, in the card reader 10 on which the magnetic field generator 50C is mounted, in order to stop generation of the disturbing magnetic field with detection of a card by the card width sensor 371 as a trigger, the control section 40 is structured so that a periodical and/or a non-periodical output of the charge signal CHG to the resonance drive part 527 of the drive control circuit 52C is stopped.

[Operation Example when Drive Control Circuit of Second Structural Example is Adopted]

Next, operation when the second structural example in FIG. 5 is adopted as a drive control circuit will be described below in association with FIGS. 8 and 10.

First, in a state that a disturbing magnetic field is not generated, as shown in FIG. 8(a), a charge signal "CHG" is supplied from the driver 524 of the drive control circuit 52 of the control section 40 to the resonance drive part 527 of the drive control circuit 52C of the magnetic field generator 50C so as to generate a disturbing magnetic field. In this case, the charge signal "CHG" is supplied in an active high level (H). When the resonance drive part 527 receives the active high level of the charge signal "CHG", the drive switching element "DSW51" is driven in a conductive state. As a result, charging is started (step ST11 in FIG. 10). In this case, the time judging section 5231 of the drive control circuit 52B stores a current time "CTM11" of a charging start time point supplied from the clock section 522 in a memory not shown at the time when the charging is started (step ST12 in FIG. 10).

In the resonance part 511, the second node "ND53" is set in an electrically connecting state with the reference potential part 526. In the resonance part 511, the drive voltage "VCC" is supplied to the first node "ND52" from the drive power supply part 525. In other words, in the resonance part 511, the second node "ND53" and the reference potential part 526 are switched to a connecting state through the resonance drive part 527 and thus charging to the capacitor "C51" is started and a resonance function is induced. As a result, as shown in FIG. 8(b), the resonance part 511 is controlled so that a first current "IL1" in a normal direction flowing through the coil (inductor) "L51" is increased and a disturbing magnetic field is generated.

Figure 10:
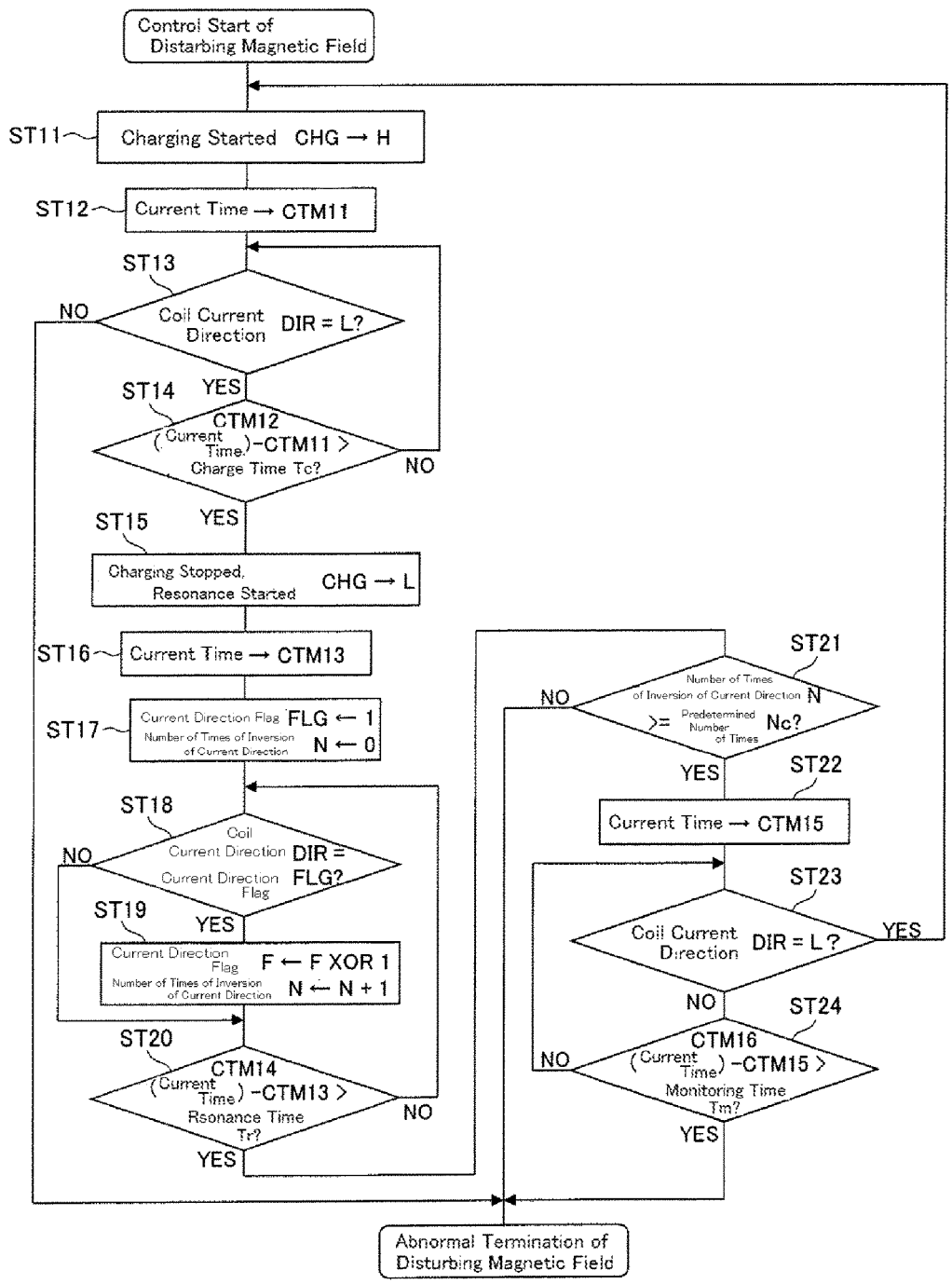
FIG. 10 is a flow chart for explaining operation in a case that the second structural example in FIG. 5 is adopted as a drive control circuit.

Then, the operation instructing section 5233B of the drive control circuit 52B confirms whether a current flowing through the coil "L51" is a first direction current "IL1" or not based on a judging result of the current direction judging section 5232B (step ST13 in FIG. 10). In a case that a current flowing through the coil "L51" is a first direction current "IL1" based on a monitoring result of the current direction monitoring circuit 53C within the charge time "Tc", the operation instructing section 5233B confirms whether the charge time "Tc" has elapsed or not in order to control the magnetic field generation part 51 in a resonance state (step ST14 in FIG. 10). Specifically, the time judging section 5231 of the drive control circuit 52B judges that a difference between a current time "CTM12" and the time "TMC11" of the charging start time point stored in the step ST12 exceeds a predetermined charging period "Tc" or not (step ST14 in FIG. 10) and the result is supplied to the operation instructing section 5233B. When the operation instructing section 5233B recognizes that, based on a judging result of the time judging section 5231, the predetermined charge time "Tc" has elapsed after the charging is started (step ST14 in FIG. 10), the operation instructing section 5233B instructs the driver 524 to switch the charge signal "CHG" to a non-active level or a low level in order to drive and control the magnetic field generation part 51 in a resonance state. As a result, the charge signal "CHG" is switched to a non-active low level and supplied to the resonance drive part 527. When the resonance drive part 527 receives a non-active low level of the charge signal "CHG", the drive switching element "DSW51" is driven in a non-conductive state. As a result, the charging is stopped and a resonance is started (step ST15 in FIG. 10). In this embodiment, when a current flowing through the coil (inductor) "L51" is switched to the first direction current "IL1" in a normal direction during the charge time "Tc" based on a judging result of the time judging section 5231, the operation instructing section 5233 starts a resonance after the charge time "Tc" has elapsed.

In the step ST13, in a case that a current flowing through the coil "L51" is not switched to the first direction current "IL1" within the charge time "Tc", the drive control circuit 52B terminates drive control of the magnetic field generation part as an abnormality.

In the step ST15, when a resonance is started, the time judging section 5231 of the drive control circuit 52B stores a current time CTM13 of the resonance start time point supplied from the clock section 522 in a memory not shown at a time when the resonance is started (step ST16 in FIG. 10). Next, the current direction judging section 5232B of the drive control circuit 52B sets a current direction flag "FLG" in, for example, "1" (or "0") and sets the number of times "N" of a current direction inversion in "0" (step ST17 in FIG. 10). In other words, the current direction judging section 5232B initializes a current direction flag "FLG" and the number of times of a current direction inversion "N". Next, the current direction judging section 5232B judges whether a current direction flowing through the coil "L51" is coincided with a direction of the set current direction flag "FLG" or not based on a compared output signal "DIR" of the current direction monitoring circuit 53C (step ST18 in FIG. 10). In the step ST18, when judged as coincided, processing of the step ST19 is performed and, when judged as not coincided, processing of the step ST20 is performed without performing the step ST19. In the step ST19, a setting value of the current direction flag "FLG" is set in a value of exclusive OR (XOR), for example, in "0", and "1" is added to the number of times "N" of the current direction inversion. Then, processing of the step ST20 is performed.

In the step ST20, the time judging section 5231 of the drive control circuit 52B judges whether a difference between a current time "CTM14" and the time "TMC13" at the resonance start time point stored in the step ST16 exceeds a predetermined resonance time "Tr" or not and the result is supplied to the operation instructing section 5233. When the operation instructing section 5233 recognizes that the predetermined resonance time "Tr" has elapsed after the resonance is started based on a judging result of the time judging section 5231 (step ST20 in FIG. 10), processing of the step ST21 is performed. When the predetermined resonance time "Tr" has not elapsed, the flow is returned to the processing of the step ST18 and setting of the current direction flag "FLG" and counting (increment) of the number of times "N" of a current direction inversion are performed until the resonance time "Tr" has elapsed. In the step ST21, the current direction judging section 5232B of the drive control circuit 52B judges whether the counted number of times "N" of a current direction inversion is not less than a predetermined number of times "Nc" stored in the storage section 521B or not and the result is supplied to the operation instructing section 5233B. When the operation instructing section 5233B confirms that the counted number of times "N" of a current direction inversion is not less than the predetermined number of times "Nc", the operation instructing section 5233B outputs an instruction to the time judging section 5231. As a result, the time judging section 5231 of the drive control circuit 52B stores a current time "CTM15" of a resonance elapsed time supplied from the clock section 522 in a memory not shown at a time when the resonance time has elapsed (step ST22 in FIG. 10).

Then, the operation instructing section 5233B confirms that a current flowing through the coil "L51" is switched from the second direction current "IL2" to the first direction current "IL1" based on a judging result of the current direction judging section 5232B (step ST23 in FIG. 10). In the step ST23, when confirmed that a current flowing through the coil "L51" is switched from the second direction current "IL2" to the first direction current "IL1" (step ST23 in FIG. 10), the operation instructing section 5233B instructs the driver 524 to output an active level or a high level of the charge signal "CHG". In this case, the flow is returned to the processing of the step ST11 and an active high level (H) of the charge signal "CHG" is supplied. When the resonance drive part 527 receives an active high level of the charge signal "CHG", the drive switching element "DSW51" is driven in a conductive state.

In the resonance part 511, the second node "ND53" is set in an electrically connecting state with the reference potential part 526. In the resonance part 511, the drive voltage "VCC" is supplied to the first node "ND52" from the drive power supply part 525. In other words, in the resonance part 511, the second node "ND53" and the reference potential part 526 are switched to a connecting state through the resonance drive part 527 and thus charging to the capacitor "C51" is started and a resonance function is induced. As a result, as shown in FIG. 8(b), the resonance part 511 is controlled so that a first current "IL1" in a normal direction flowing through the coil (inductor) "L51" is increased and a disturbing magnetic field is generated. In other words, charging is started again at a timing when a current flowing through the coil "L51" is switched to a normal direction (first current direction) and thus a disturbing magnetic field is generated with a satisfactory charging efficiency. In other words, also in this case, the processing from the step ST11 is repeated.

In the step ST23, when it is not confirmed that a current flowing through the coil "L51" is switched from the second direction current "IL2" to the first direction current "IL1", the time judging section 5231 of the drive control circuit 52B judges whether a difference between a current time "CTM16" and the time "TMC15" stored in the step ST22 exceeds a predetermined monitoring time "Tm" or not (step ST24 in FIG. 10) and the result is supplied to the operation instructing section 5233B. The operation instructing section 5233B repeats the processing of the step 23 until a predetermined monitoring time "Tm" has elapsed after the resonance is started based on a judging result of the time judging section 5231.

On the other hand, in a case that the acquired number of times "N" of inversion does not reach the predetermined number of times "Nc" within the resonance time "Tc" in the step ST21 and, in a case that a current flowing through the coil "L51" is not switched from the second direction current "IL2" to the first direction current "IL1" even when the monitoring time "Tm" has elapsed based on information from the time judging section 5231 in the step ST24, the operation instructing section 5233B terminates drive control of the magnetic field generation part as an abnormality.

As described above, in this embodiment, a timing for charging the magnetic field generation part 51 is controlled depending on a current direction flowing through the coil "L51" which is obtained by monitoring of the current direction monitoring circuit 53C. In other words, in this embodiment, a timing for flowing a DC current to the capacitor "C51" of the parallel resonance circuit to store electric charge can be appropriately set by monitoring of a direction of an AC current flowing through the coil "L51" and/or by monitoring of the number of times of a current direction inversion in the magnetic field generator 50. Therefore, a disturbing magnetic field can be controlled efficiently with a high degree of accuracy, and illegal acquisition of magnetic data by using a skimming magnetic head can be surely prevented. Further, in the magnetic field generator 50, drive control of the magnetic field generation part is terminated as an abnormality when a resonance circuit element is damaged by always monitoring a current state of the coil which is an inductor. In addition, in the magnetic field generator 50, malfunction due to damage of a resonance circuit element and disconnection of the coil can be detected by always monitoring a current state of the coil and thus reliability of the disturbing magnetic field generator can be improved. Further, the current direction monitoring circuit 53 can be realized by adding a comparator circuit element.

As a comparison example, charging and resonance operation will be described below in a case that, different from this embodiment, monitoring of a current direction flowing through the coil "L51" and/or monitoring of the number of times of a current direction inversion are not executed.

Figure 11:
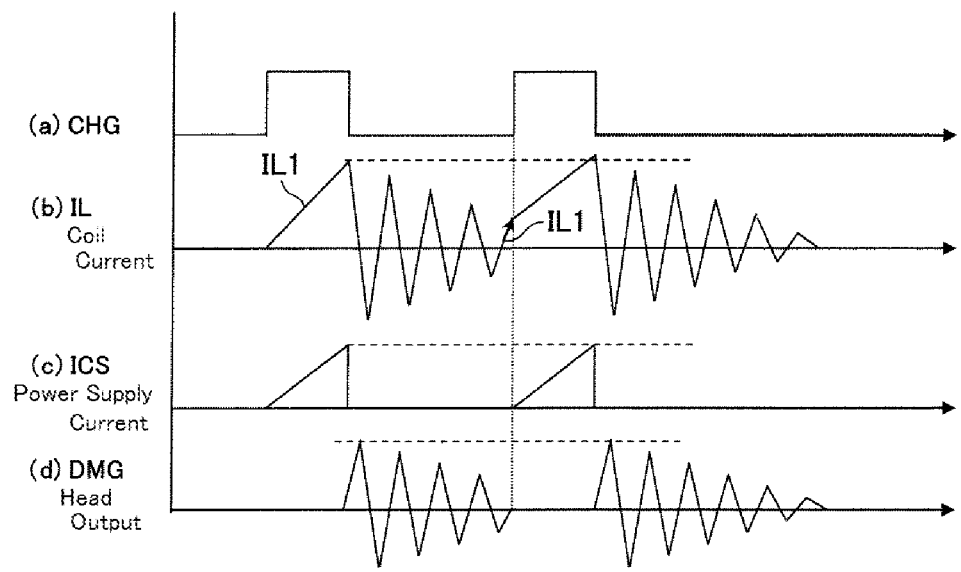
FIG. 11 is a waveform diagram showing a state that charging and resonance operation are performed normally in a case that monitoring of an electric current direction is not executed.

FIG. 11 is a waveform diagram showing a state that charging and resonance operation are normally performed in a case that monitoring of a current direction is not executed.

Figure 12:
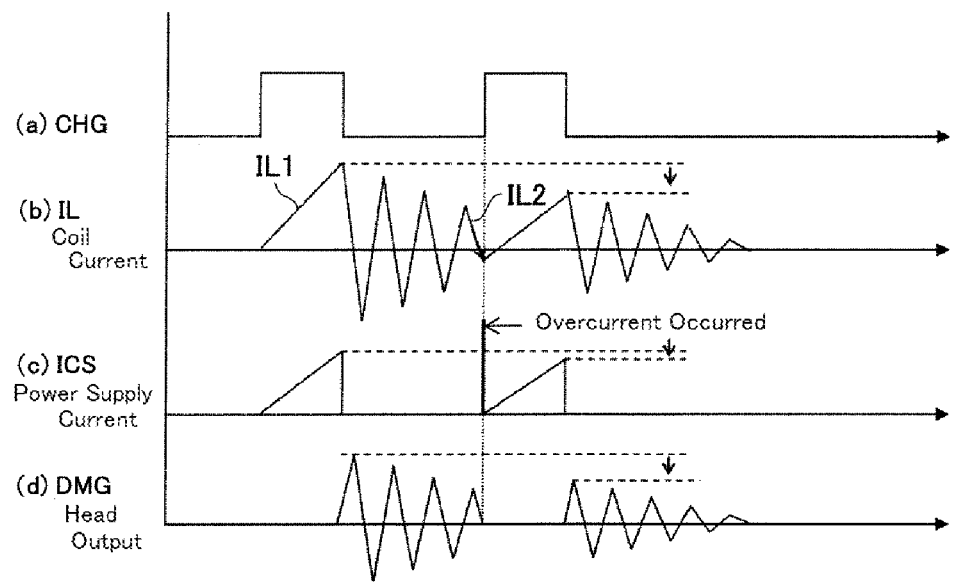
FIG. 12 is a waveform diagram showing a state that charging and resonance operation are not performed normally in a case that monitoring of an electric current direction is not executed.

FIG. 12 is a waveform diagram showing a state that charging and resonance operation are not performed normally in a case that monitoring of a current direction is not executed.

In FIGS. 11 and 12, (a) indicates a charge signal "CHG", (b) indicates a coil current "IL" (1, 2), (c) indicates a power supply current "ICS", and (d) indicates a disturbing magnetic field "DMG" which is an output of the disturbing magnetic field generator.

Also in a parallel resonance circuit of a magnetic field generator in a case that monitoring of a current direction is not executed, first, a DC current is flowed to a capacitor to perform charging for storing electric charge and, next, resonance operation in which an AC current is flowed between a coil and the capacitor is performed by discharging electricity stored in the capacitor. In the charging and resonance operation, as shown in FIGS. 11(a) and 11(b), when the next charging is accidentally performed at a timing that a current direction is switched from the second direction current "IL2" to the first direction current "IL1", the capacitor is capable of storing electric charge appropriately. As a result, a mutual induction action is applied to a coil of a skimming head to disturb its output and thus acquisition of magnetic data can be disturbed.

However, in a case that charging and a resonance are continuously and repeatedly performed in the magnetic field generator 50, as shown in FIGS. 12(a) through 12(d), when charging is performed at a timing that a current of the coil flows in a reverse direction during a resonance (capacitor is under discharging), charging efficiency to the capacitor is deteriorated and a disturbing output intensity to the skimming magnetic head may be also deteriorated.

On the other hand, in this embodiment, a timing for flowing a DC current to the capacitor "C51" of the parallel resonance circuit to store electric charge can be appropriately set by monitoring of a current direction flowing through the coil "L51" and/or monitoring of the number of times of a current direction inversion. Therefore, a disturbing magnetic field can be controlled efficiently with a high degree of accuracy and illegal acquisition of magnetic data by using a skimming magnetic head can be surely prevented.

In a case that the magnetic field generator 50 having such features is applied to the card reader 10, it may be structured that, in order that a residual disturbing magnetic field does not affect the magnetic detection, the magnetic field generation is temporarily stopped for discharging resonance energy accumulated in the resonance part 511 of the drive control circuit 52. In this structure, for example, in the magnetic field generator 50, a transistor as a first switching element for discharging is connected with the first node "ND52" of the resonance part 511 to secure a discharging path (escape path) of resonance energy. Further, in the magnetic field generator 50C, a transistor as a second switching element is connected in a supply line of the drive voltage "VCC" of the drive power supply part 525 to the resonance part 511 for stopping supply of the drive voltage "VCC" to the first node "ND52" of the resonance part 511 when disturbing magnetic field generating operation is stopped. In this case, it is preferable that, when the disturbing magnetic field generating operation is to be stopped, the second switching element is turned off and the first node "ND52" is separated from a supply source of the drive voltage "VCC" and then, the first switching element is turned on and the resonance energy is discharged. On the other hand, when starting the magnetic field generating operation, the first switching element is turned off and the discharging path is closed and then, the second switching element is turned on for connecting with the supply source of the drive voltage "VCC".

[Card Taking-in and Ejecting Operation of Card Reader]

Finally, as one example, taking-in and ejecting operations of a card "MC" in the card reader 10 will be described below in association with a drive timing of the magnetic field generator 50. In the following descriptions, the operation of magnetic field generation when a current direction is monitored as described in detail above is omitted and is simply described as operation of disturbing magnetic field generation. In other words, in a disturbing magnetic field generation step, all operations such as charging start control including monitoring a current direction are performed and similar processing as shown in FIGS. 9 and 10 is performed in generation of a disturbing magnetic field.

Figure 13:
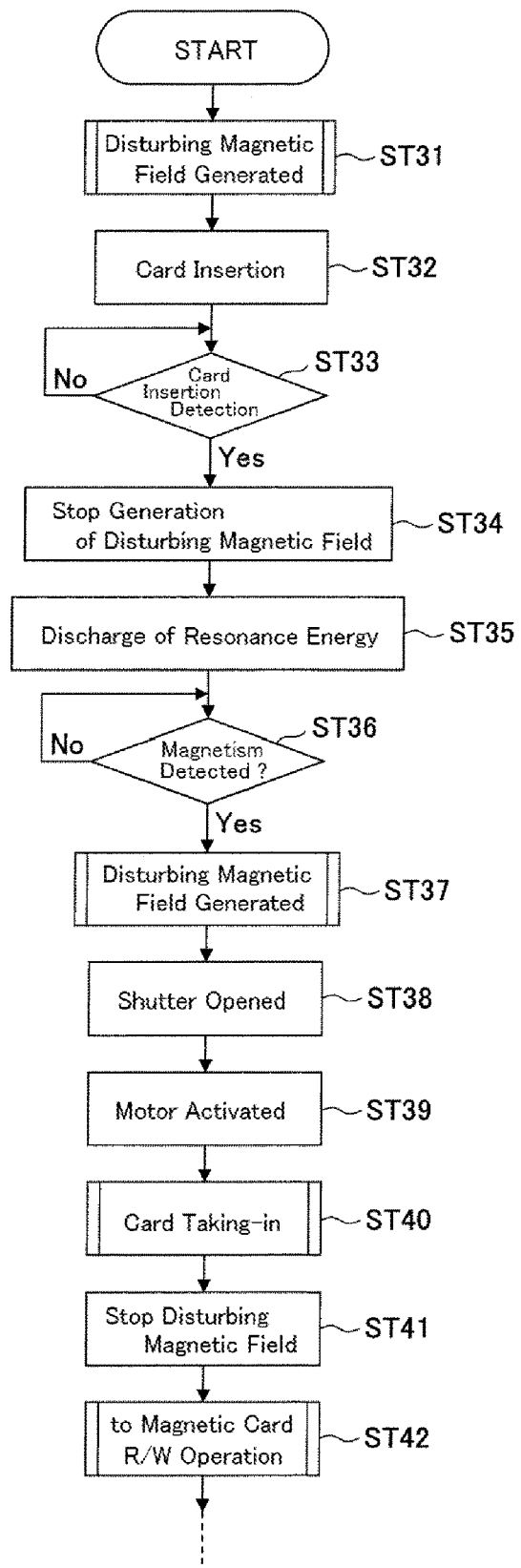
FIG. 13 is a flow chart for explaining card taking-in operation.
Figure 14:
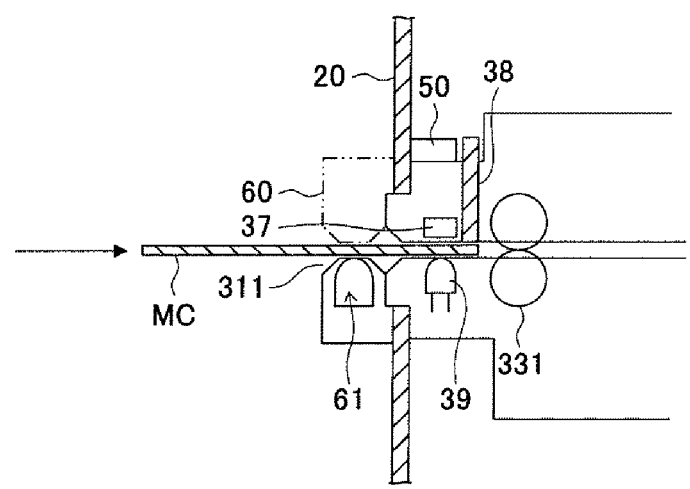
FIG. 14 is a view for explaining card taking-in operation.

First, taking-in operation will be described in association with FIGS. 13 and 14. FIG. 13 is a flow chart for explaining card taking-in operation. FIG. 14 is a view for explaining card taking-in operation.

In this embodiment, the drive control circuit 52 of the magnetic field generator 50 is driven under control of the control section 40 and a disturbing magnetic field is generated to a skimming magnetic head (step ST31). A disturbing magnetic field is generated by similar processing as shown in FIGS. 9 and 10. When a user inserts a card "MC" into the card insertion port 311 in a generated state of the disturbing magnetic field (step ST32), the inserted card is detected by the card width sensor 371 (step ST33). The detection information is supplied to the control section 40.

When the insertion of the card "MC" is detected, the control section 40 executes so that the pre-head 39 slides on a magnetic stripe "mp" formed on the card "MC" and magnetic data written in the magnetic stripe "mp" are read. In this case, when the pre-head 39 reads magnetic data of the card "MC" for performing magnetic detection, the control section 40 stops a magnetic field generation similarly to the above-mentioned operation so that a residual disturbing magnetic field does not affect the magnetic detection and discharges resonance energy accumulated in the resonance part 511 of the drive control circuit 52 (steps ST34 and ST35). In this state, a magnetic stripe part formed on the inserted card "MC" is detected by the pre-head 39 for card insertion detection (step ST36). Then, the control section 40 drives the drive control circuit 52 of the magnetic field generator 50 for a predetermined time based on a detection signal by the pre-head 39 to generate a disturbing magnetic field (step ST37). Then, in the state that the disturbing magnetic field is generated, the control section 40 moves the shutter 38 to open (step ST8), activates the drive motor 36 (step ST39), and a conveying system including the conveying roller 331 for taking-in is driven.

As a result, the card "MC" can be taken into the inside. When the card "MC" is inserted to a rear side with respect to a position of the shutter 38, its tip end is caught by the conveying roller 331 and a taking-in operation of the card "MC" is started (step ST40).

In this embodiment, after a taking-in operation of the card "MC" is started, for example, the disturbing magnetic field is generated by the magnetic field generator 50 in a state that a rear end of the card "MC" is protruded from the card insertion port 311 and, after that, generation of the disturbing magnetic field is stopped (step ST41). A generation time period of the disturbing magnetic field can be managed based on an elapsed time from a detection time point by the pre-head 39 for card insertion detection and/or the card width sensor 371 and the like.

Next, after the card "MC" has been taken into a position of the magnetic head 34 for reading, reading operation or writing operation for the card "MC" is performed by the magnetic head 34 (step ST42).

As described above, in a taking-in operation of a card "MC" in this embodiment, a disturbing magnetic field is generated at a time when a rear end of the card "MC" is protruded from the card insertion port 311. As a result, for example, as shown by the imaginary line in FIG. 14, even if a skimming magnetic head 61 is attached at a position on an outer side of the card insertion port 311, for example, on a surface of the front panel 20 of a host apparatus, magnetic data of the inserted card "MC" cannot be read completely by the skimming magnetic head 61 by generating the disturbing magnetic field. Therefore, illegal reading of magnetic data by the skimming magnetic head 61 can be prevented.

Figure 15:
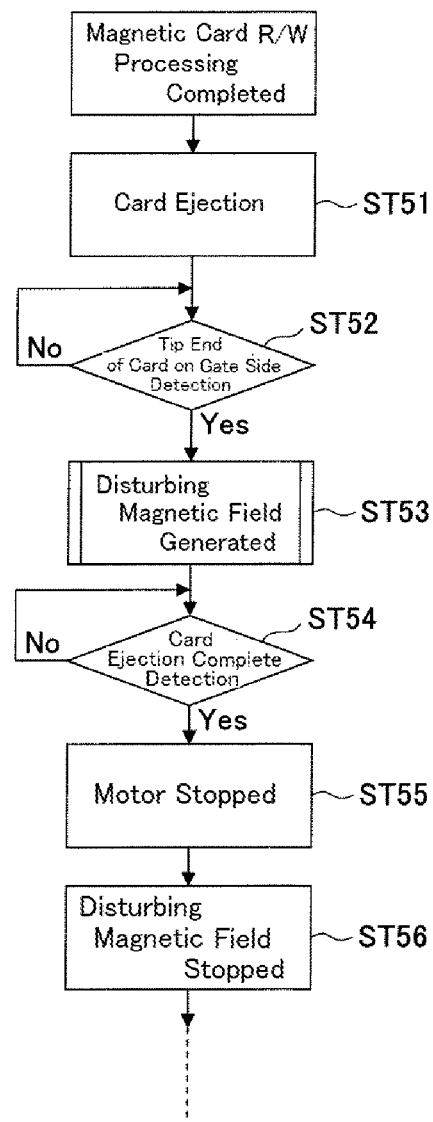
FIG. 15 is a flow chart for explaining card ejecting operation.
Figure 16:
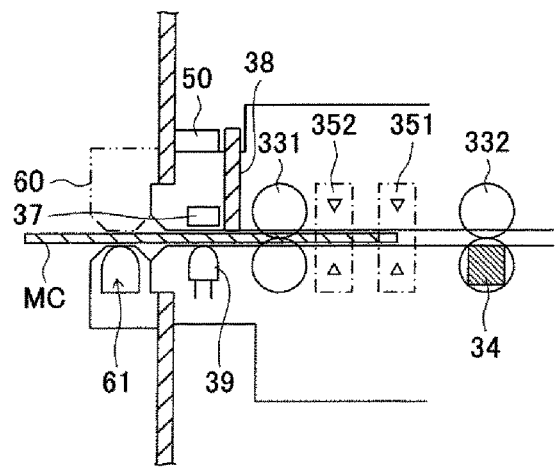
FIG. 16 is a view for explaining card ejecting operation.

Next, ejecting operation will be described below in association with FIGS. 15 and 16. FIG. 15 is a flow chart for explaining card ejecting operation. FIG. 16 is a view for explaining card ejecting operation.

In this case, an ejecting operation of the card "MC" is started by the conveying rollers 331, 332 and 333 (step ST51) and, when a tip end in an ejecting direction of the ejecting card "MC" is detected by the card width sensor 371 (step ST52), the magnetic field generator 50 is driven to generate a disturbing magnetic field (step ST53). Generation of the disturbing magnetic field is performed similarly to the processing shown in FIGS. 9 and 10.

After that, when a rear end of the ejecting card "MC" is detected by the photo sensor 352 (step ST54), the drive motor 36 is stopped (step ST55) and the card ejecting operation is terminated. Then, the control section 40 stops drive of the drive control circuit 52 of the magnetic field generator 50 and generation of the disturbing magnetic field is stopped (step ST56).

At a time when the card ejecting operation is terminated, a rear end of the card "MC" is set in a held state by the conveying roller 331. When a user pulls the card "MC" lightly, the card "MC" can be taken out from the card insertion port 311. In a case that a user has forgotten to take out the card "MC", after a predetermined time has elapsed, the conveying roller is driven and the card "MC" is collected in the inside.

As described above, in the card reader 10 in this embodiment, also at a time of card ejection, a disturbing magnetic field is temporarily generated in a state that its tip end portion on an ejection side is protruded to the outside from the card insertion port 311. Therefore, even if a skimming magnetic head 61 is attached to a surface of the front panel, reading of magnetic data of an ejecting card "MC" by the skimming magnetic head 61 can be prevented.

This embodiment is one example in which the magnetic field generator 50 is driven only once over a predetermined period at a card inserting time and a card ejecting time. However, the magnetic field generator 50 may be driven twice or more intermittently and various aspects may be applicable.

Principal Effects of Embodiments

As described above, in this embodiment, the following effects can be obtained.

In this embodiment, basically, an LC parallel resonance circuit formed by connecting a coil "L" which is an inductor and a capacitor "C" is provided and a strong magnetic field by the LC parallel resonance circuit is continuously generated over a predetermined period owing to a retention property of resonance energy. Further, in this embodiment, a timing for charging the magnetic field generation part 51 is controlled depending on a current direction flowing through the coil "L51" which is obtained by monitoring of the current direction monitoring circuit 53. Further, in a case that charging and a resonance are repeatedly and continuously performed, the magnetic field generator 50 is not charged at a timing when a current of the coil "L51" is flowed in a reverse direction (capacitor C51 is discharging) during the resonance. Therefore, a drive power supply part 525 (power supply circuit) is prevented from being damaged due to a generated counter-electromotive force and thus the disturbing magnetic field can be controlled safely with a satisfactory energy efficiency, for example, a satisfactory charging efficiency to the capacitor "C51".

In the magnetic field generator 50, the judging section 523 includes the time judging section 5231 which judges whether a previously set resonance time "Tr" has elapsed or not after the charging is stopped, and the operation instructing section 5233 drives and controls the magnetic field generation part 51 to charge after confirming that the resonance time "Tr" has elapsed and a current flowing through the coil L51 is switched to the first direction current IL1 in a normal direction. As a result, the previously set resonance time "Tr" is judged and, after an appropriate time has elapsed, it is confirmed that a current is switched to the first direction. Therefore, a timing for flowing a DC current to the capacitor "C51" of the resonance part 511 (magnetic field generation part 51) to store charge can be further appropriately set with a high degree of accuracy.

In the magnetic field generator 50, the time judging section 5231 of the judging section 523 judges whether the previously set monitoring time "Tm" has elapsed or not after the resonance time "Tr" has elapsed, and the operation instructing section 5233 drives and controls the magnetic field generation part 51 to perform charging when a current flowing through the coil "L51" is not shifted to the first direction current "IL1" in a normal direction after the monitoring time "Tm" has elapsed. Therefore, the operation instructing section 5233 of the magnetic field generator 50 drives and controls the magnetic field generation part 51 to perform charging when a current flowing through the coil "L51" is not shifted to the first direction current "IL1" after the monitoring time "Tm" has elapsed and thus charging and a resonance can be continuously performed over a desired period.

In addition, the time judging section 5231 of the magnetic field generator 50 judges whether the previously set charge time "Tc" has elapsed or not and, in a case that a current flowing through the coil "L51" is switched to the first direction current "IL1" during the charge time "Tc" based on a monitoring result of the current direction monitoring circuit 53, the operation instructing section 5233 starts a resonance after the charge time "Tc" has finished. Therefore, when the operation instructing section 5233 recognizes that the previously set charge time "Tc" has elapsed, the operation instructing section 5233 drives and controls the magnetic field generation part 51 in a resonance state and thus resonance can be started at an appropriate timing.

When a current flowing through the coil "L51" is not switched to the first direction current "IL1" within the charge time "Tc", the operation instructing section 5233 of the judging section 523 terminates drive control of the magnetic field generation part as an abnormality. Therefore, malfunction due to damage of the resonance circuit elements (coil "L51" and capacitor "C51") structuring the resonance part 511 and disconnection of the coil "L51" can be detected and thus reliability of the magnetic field generator 50 can be improved.

Next, in this embodiment, in the magnetic field generator 50, a timing for flowing a DC current to the capacitor "C51" of the parallel resonance circuit to store electric charge can be appropriately set by executing monitoring of an AC current direction flowing through the coil "L51" and/or monitoring of the number of times of a current direction inversion. Therefore, a disturbing magnetic field can be controlled efficiently with a high degree of accuracy, and illegal acquisition of magnetic data by using a skimming magnetic head can be surely prevented. Further, in the magnetic field generator 50, monitoring of the number of times of a current direction inversion of a current flowing through the coil "L51" is executed and thereby malfunction due to damage of the resonance circuit elements and disconnection of the coil can be detected and thus reliability of the device can be improved. Further, in a case that the number of times of current direction inversion has reached a predetermined number of times, a timing for charging is controlled and thus a timing for storing electric charge can be set with a further high degree of accuracy.

In this embodiment, the card reader 10 for processing magnetic data recorded in a card "MC" includes the magnetic field generator 50 structured to generate a magnetic field for disturbing reading of magnetic data of the card "MC". However, the current direction monitoring circuit 53 is structured of a comparator circuit element and thus the size of the structure can be reduced and a timing for flowing a DC current to the capacitor "C51" of the resonance circuit to store an electric charge can be appropriately set and a disturbing magnetic field can be efficiently controlled with a high degree of accuracy. In addition, in the card reader 10, a disturbing magnetic field is capable of being generated with an appropriate time period and intensity and thus illegal acquisition of magnetic data can be surely prevented with a high degree of accuracy.

Therefore, according to this embodiment, even if a fraudulent person attaches a so-called skimming magnetic head device (skimmer) 60 including a skimming magnetic head and a magnetic reading circuit to a card insertion port of the card reader on an outer side of the front panel in order to read magnetic data of a card, a strong magnetic field can be generated, an output of a disturbing magnetic field can be increased, the disturbing magnetic field can be controlled with a satisfactory energy efficiency, and illegal acquisition of magnetic data by using a skimming magnetic head can be surely prevented with a high degree of accuracy.

Other Embodiments

Although the present invention has been shown and described with reference to a specific embodiment, various changes and modifications will be apparent to those skilled in the art from the teachings herein.

For example, in the embodiment described above, as shown in FIG. 3, an LC parallel resonance circuit is structured of a coil (inductor) "L51" and a capacitor "C51" connected in parallel with each other. However, the present invention is not limited to this embodiment. For example, an LC series resonant circuit structured of a coil (inductor) "L51" and a capacitor "C51" which are serially-connected with each other may be used.

Figure 17:
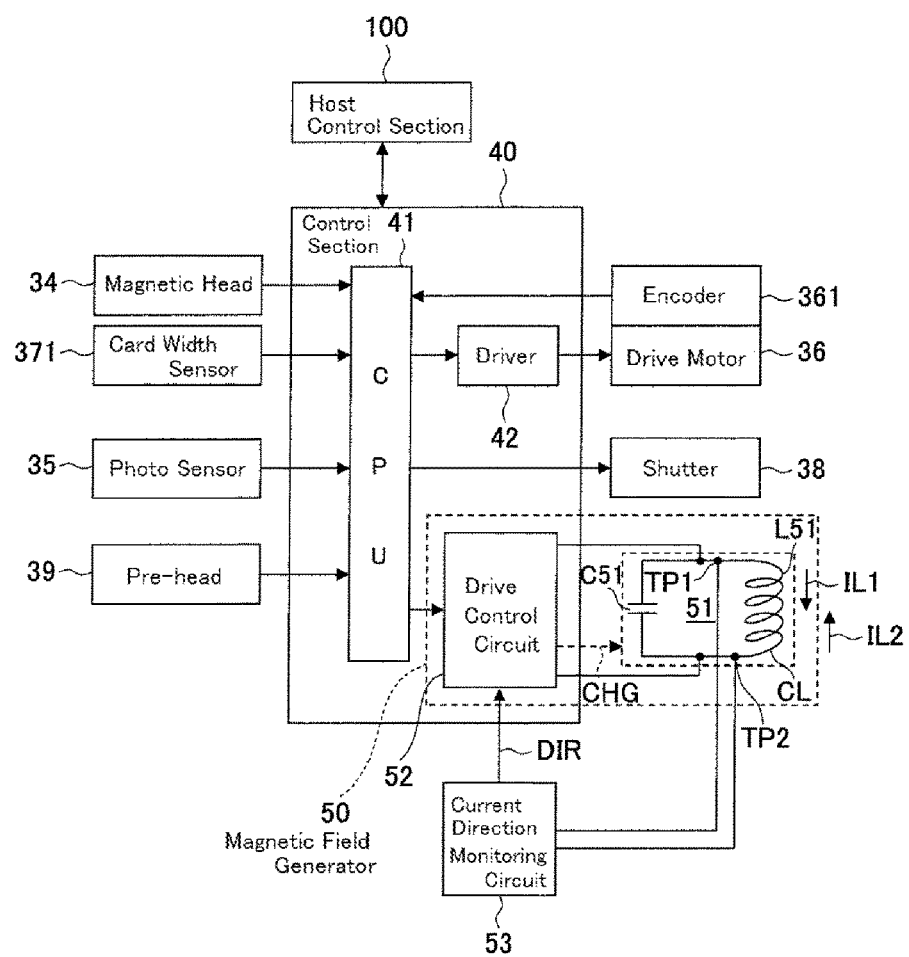
FIG. 17 is a block diagram showing another schematic structure of a control section and its relating portions of the card reader shown in FIG. 1.

For example, in the embodiment described above, as shown in FIG. 3, the coil "L1" of the parallel resonance circuit of the magnetic field generation part 51 is formed by winding the coil "L51" around an iron core "FC" but, as shown in FIG. 17, a coil "L1" may be formed without using an iron core.

In a case that the magnetic field generator 50 is applied to the card reader 10, it can be structured that, in order that a residual disturbing magnetic field does not affect the magnetic detection, the magnetic field generation is temporarily stopped for discharging resonance energy of the resonance part 511 of the drive control circuit 52. In this structure, for example, in the magnetic field generator 50C, a transistor as a first switching element for discharging is connected with the first node "ND52" of the resonance part 511 to secure a discharging path (escape path) of resonance energy.

Further, in the magnetic field generator 50C, a transistor as a second switching element is connected in a supply line of the drive voltage "VCC" of the drive power supply part 525 to the resonance part 511 for stopping supply of the drive voltage "VCC" to the first node "ND52" of the resonance part 511 when disturbing magnetic field generating operation is stopped. In this case, when the disturbing magnetic field generating operation is to be stopped, the second switching element is turned off and the first node "ND52" is separated from a supply source of the drive voltage "VCC" and then, the first switching element is turned on and the resonance energy is discharged. As a result, resonance energy can be efficiently discharged.

On the other hand, when the magnetic field generating operation is to be started, the first switching element is turned off and the discharging path is closed and then, the second switching element is turned on for connecting with the supply source of the drive voltage "VCC". As a result, generation of a magnetic field can be efficiently started or restarted. According to adopt this structure, an erroneous detection of a magnetic field by the pre-head 39 can be prevented and opening and closing of a shutter can be controlled with a satisfactory responsibility and, as a result, even when a card is inserted quickly, the card is prevented from hitting (colliding) with a shutter.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A magnetic field generator comprising:
   a magnetic field generation part comprising a resonance part comprising an inductor and a capacitor connected with each other and which is structured so that an AC current is flowed between the inductor and the capacitor by charging electric charge to the capacitor and discharging the electric charge to generate a magnetic field by a resonance;
   a current direction monitoring section structured to monitor a direction of a current flowing through the inductor of the magnetic field generation part; and
   a judging section structured to control a timing for charging in the magnetic field generation part depending on the direction of the current flowing through the inductor which is obtained by monitoring of the current direction monitoring section.

2. The magnetic field generator according to claim 1, wherein
   the inductor is alternately flowed with a first direction current flowing from one end side to the other end side and a second direction current from the other end side to the one end side, and
   the judging section comprises:
   a current direction judging section which configured to judge whether the current flowing through the inductor is switched to the first direction current or not based on a monitoring result of the current direction monitoring section; and
   an operation instructing section configured to drive and control to charge the magnetic field generation part based on that the current flowing through the inductor is switched to the first direction current.

3. The magnetic field generator according to claim 2, wherein
   the judging section comprises a time judging section configured to judge whether a resonance time previously set has elapsed or not after the charging is stopped, and
   the operation instructing section is configured to confirm that the resonance time has elapsed and that the current flowing through the inductor is switched to the first direction current and drives and controls to charge the magnetic field generation part.

4. The magnetic field generator according to claim 3, wherein
   the time judging section of the judging section is configured to judge whether a monitoring time previously set has elapsed or not after the resonance time has elapsed, and
   the operation instructing section is configured to drive and control to charge the magnetic field generation part when the monitoring time has elapsed and the current flowing through the inductor is not switched to the first direction current.

5. The magnetic field generator according to claim 3, wherein
   the time judging section of the judging section is configured to judge whether a charge time previously set has elapsed or not, and
   the operation instructing section is configured to start a resonance after the charge time has elapsed when the current flowing through the inductor is switched to the first direction current within the charge time based on a monitoring result of the current direction monitoring section.

6. The magnetic field generator according to claim 5, wherein the operation instructing section of the judging section is configured to terminate as an abnormality when the current flowing the inductor is not switched to the first direction current within the charge time.

7. The magnetic field generator according to claim 5, wherein
the time judging section of the judging section is configured to judge whether a monitoring time previously set has elapsed or not, and
the operation instructing section is configured to terminate drive control of the magnetic field generation part as an abnormality without charging the magnetic field generation part in a case that the current flowing through the inductor is not switched to the first direction current even when the monitoring time has elapsed.

8. The magnetic field generator according to claim 7, wherein
the judging section comprises a time judging section configured to judge whether a resonance time previously set has elapsed or not after the charging is stopped and judges whether a monitoring time previously set has elapsed or not after the resonance time has elapsed,
the current direction judging section is configured to acquire a number of times of inversion of the current flowing through the inductor within the resonance time based on a monitoring result of the current direction monitoring section, and
the operation instructing section is configured to drive and control the magnetic field generation part depending on the current flowing through the inductor based on a monitoring result of the current direction monitoring section within the monitoring time in a case that an acquired number of times of inversion within the resonance time is not less than a predetermined number of times.

9. The magnetic field generator according to claim 2, wherein
the judging section comprises a time judging section configured to judge whether a resonance time previously set has elapsed or not after the charging is stopped and judge whether a monitoring time previously set has elapsed or not after the resonance time has elapsed,
the current direction judging section is configured to acquire a number of times of inversion of the current flowing through the inductor within the resonance time based on a monitoring result of the current direction monitoring section, and
the operation instructing section is configured to drive and control the magnetic field generation part depending on the current flowing through the inductor based on a monitoring result of the current direction monitoring section within the monitoring time in a case that an acquired number of times of inversion within the resonance time is not less than a predetermined number of times.

10. The magnetic field generator according to claim 9, wherein the operation instructing section of the judging section is configured to terminate drive control of the magnetic field generation part as an abnormality in a case that the acquired number of times of inversion does not reach the predetermined number of times within the resonance time.

11. The magnetic field generator according to claim 9, wherein
the judging section comprises a time judging section which configured to judge whether a resonance time previously set has elapsed or not after the charging is stopped, and
the operation instructing section is configured to confirm that the resonance time has elapsed and that the current flowing through the inductor is switched to the first direction current and drives and controls to charge the magnetic field generation part.

12. A control method for a magnetic field generator comprising:
previously providing a resonance part in which an inductor and a capacitor are connected with each other;
flowing an AC current between the inductor and the capacitor by charging electric charge to the capacitor and discharging the electric charge; and
when the magnetic field generation part for generating a magnetic field by a resonance is to be driven and controlled, monitoring a direction of a current flowing through the inductor of the magnetic field generation part, and controlling a timing for charging the magnetic field generation part depending on the direction of the current flowing through the inductor which is obtained by the monitoring.

13. The control method for a magnetic field generator according to claim 12, wherein
the inductor is alternately flowed with a first direction current from one end side to the other end side and a second direction current from the other end side to the one end side, and
the magnetic field generation part is driven and controlled to be charged based on that a current flowing through the inductor is switched to the first direction current.

14. The control method for a magnetic field generator according to claim 13, wherein
when a resonance time previously set has elapsed after the charging is stopped, it is confirmed that the current flowing through the inductor is switched to the first direction current based on a monitoring result of the direction of the current, and then
the magnetic field generation part is driven and controlled to be charged.

15. The control method for a magnetic field generator according to claim 14, wherein in a case that the current flowing through the inductor is not switched to the first direction current even when a monitoring time previously set has elapsed, the magnetic field generation part is driven and controlled to be charged.

16. The control method for a magnetic field generator according claim 14, wherein in a case that the current flowing through the inductor is switched to the first direction current based on the monitoring result within a charge time previously set after the charging is started, a resonance is started after the charge time has elapsed.

17. The control method for a magnetic field generator according to claim 16, wherein when the current flowing through the inductor is not switched to the first direction current within the charge time, processing is terminated as an abnormality.

18. The control method for a magnetic field generator according to claim 16, wherein in a case that the current flowing through the inductor is not switched to the first direction current even when a monitoring time previously set has elapsed, drive control of the magnetic field generation part is terminated as an abnormality without charging the magnetic field generation part.

19. The control method for a magnetic field generator according to claim 18, wherein
a number of times of inversion of the current flowing through the inductor within a resonance time previously set after the resonance is started is acquired based on a monitoring result of the direction of the current, and
in a case that an acquired number of times of inversion is not less than a predetermined number of times, drive control of the magnetic field generation part is performed depending on the current flowing through the inductor based on the monitoring result within a monitoring time previously set.

20. The control method for a magnetic field generator according to claim 13, wherein
a number of times of inversion of the current flowing through the inductor within a resonance time previously set after the resonance is started is acquired based on a monitoring result of the direction of the current, and
in a case that an acquired number of times of inversion is not less than a predetermined number of times, drive control of the magnetic field generation part is performed depending on the current flowing through the inductor based on the monitoring result within a monitoring time previously set.

21. The control method for a magnetic field generator according to claim 20, wherein in a case that the acquired number of times of inversion does not reach the predetermined number of times within the resonance time, drive control of the magnetic field generation part is terminated as an abnormality.

22. The control method for a magnetic field generator according to claim 20, wherein
when a resonance time previously set has elapsed after the charging is stopped, it is confirmed that the current flowing through the inductor is switched to the first direction current based on a monitoring result of the direction of the current, and then
the magnetic field generation part is driven and controlled to be charged.

23. The control method for a magnetic field generator according to claim 22, wherein in a case that the current flowing through the inductor is switched to the first direction current based on the monitoring result within a charge time previously set after the charging is started, a resonance is started after the charge time has elapsed.

24. A magnetic recording medium processing device structured to process magnetic information recorded on a magnetic recording medium, the magnetic recording medium processing device comprising:
a magnetic field generator structured to generate a magnetic field for disturbing reading of magnetic information of a magnetic recording medium,
wherein the magnetic field generator comprises:
a magnetic field generation part comprising a resonance part comprising an inductor and a capacitor is connected with each other, and which is structured so that an AC current is flowed between the inductor and the capacitor by charging electric charge to the capacitor and discharging the electric charge to generate a magnetic field by a resonance;
a current direction monitoring section configured to monitor a direction of a current flowing through the inductor of the magnetic field generation part; and
a judging section which configured to control a timing for charging to the magnetic field generation part depending on the direction of the current flowing through the inductor which is obtained by monitoring of the current direction monitoring section.

* * * * *